(12) United States Patent
Chun et al.

(10) Patent No.: US 8,278,231 B2
(45) Date of Patent: *Oct. 2, 2012

(54) HEAT STABLE FORMED CERAMIC, APPARATUS AND METHOD OF USING THE SAME

(75) Inventors: Changmin Chun, Belle Mead, NJ (US); Frank Hershkowitz, Liberty Corner, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/277,056

(22) Filed: Nov. 24, 2008

(65) Prior Publication Data

US 2010/0126907 A1    May 27, 2010

(51) Int. Cl.
  *C04B 35/482* (2006.01)
(52) U.S. Cl. .................. 501/103; 501/104; 501/105
(58) Field of Classification Search ............... 501/103, 501/104, 105
  See application file for complete search history.

(56) References Cited

U.S. PATENT DOCUMENTS

| | | | |
|---|---|---|---|
| 1,723,679 A | 8/1929 | Coberly et al. | |
| 1,843,965 A | 2/1932 | Wulff | |
| 1,880,306 A | 10/1932 | Wulff | |
| 1,880,307 A | 10/1932 | Wulff | |
| 1,880,308 A | 10/1932 | Wulff | |
| 1,880,309 A | 10/1932 | Wulff | |

(Continued)

FOREIGN PATENT DOCUMENTS

BE    491 423    10/1949

(Continued)

OTHER PUBLICATIONS

Bartholome, V.E., "*Methods of Energy Addition for Endothermic Gas Reactions at High Temperatures*", Zeitschrift fuer Elektrochemie und Angewandte Physikalische Chemie, 57, pp. 497-502 (1953).

(Continued)

*Primary Examiner* — Karl Group

(57) ABSTRACT

In one aspect, the invention includes a heat stable, formed ceramic component that includes a multimodal grain distribution including (i) at least 50 wt % of coarse grains including stabilized zirconia, the coarse grains comprising a D50 grain size in the range of from 5 to 800 μm, based upon the total weight of the component; and (ii) at least 1 wt % of fine grains comprising a D50 average grain size not greater than one-fourth the D50 grain size of the coarse grain, dispersed within the coarse grains, based upon the total weight of the component; wherein after sintering, the component has porosity at ambient temperature in the range of from 5 to 45 vol. %, based on the formed volume of the component. In other embodiments, the invention includes a process for the manufacture of a hydrocarbon pyrolysis product from a hydrocarbon feed using a regenerative pyrolysis reactor system, comprising the steps of: (a) heating a pyrolysis reactor comprising a bi-modal stabilized zirconia ceramic component to a temperature of at least 1500° C. to create a heated reactive region, wherein after exposing the component to a temperature of at least 1500° C. for two hours the component has a bulk porosity measured at ambient temperature in the range of from 5 to 45 vol. %, based on the bulk volume of the component; (b) feeding a hydrocarbon feed to the heated pyrolysis reactor to pyrolyze the hydrocarbon feed and create a pyrolyzed hydrocarbon feed; and (c) quenching the pyrolyzed hydrocarbon feed to produce the hydrocarbon pyrolysis product.

16 Claims, 4 Drawing Sheets

U.S. PATENT DOCUMENTS

| | | | |
|---|---|---|---|
| 1,880,310 A | 10/1932 | Wulff | |
| 1,917,627 A | 7/1933 | Wulff | |
| 1,938,991 A | 12/1933 | Wulff | |
| 1,966,185 A | 7/1934 | Prcisman | |
| 1,966,779 A | 7/1934 | Wulff | |
| 2,037,056 A | 4/1936 | Wulff | |
| 2,160,170 A | 5/1939 | Martin et al. | |
| 2,236,534 A | 4/1941 | Hasche | |
| 2,236,555 A | 4/1941 | Wulff | |
| 2,319,679 A | 5/1943 | Hasche et al. | |
| 2,319,759 A | 5/1943 | Black | |
| 2,343,866 A | 3/1944 | Hincke | |
| 2,558,861 A | 7/1951 | Liggett | |
| 2,580,766 A | 1/1952 | Hall | |
| 2,645,673 A | 7/1953 | Hasche | |
| 2,678,339 A | 5/1954 | Harris | |
| 2,692,819 A | 10/1954 | Hasche et al. | |
| 2,706,210 A | 4/1955 | Harris | |
| 2,718,534 A | 9/1955 | Harris | |
| 2,790,838 A | 4/1957 | Schrader | |
| 2,796,951 A | 6/1957 | Bogart | |
| 2,813,919 A | 11/1957 | Pearce | |
| 2,830,677 A | 4/1958 | Coberly | |
| 2,845,335 A | 7/1958 | Hasche | |
| 2,851,340 A | 9/1958 | Coberly et al. | |
| 2,885,455 A | 5/1959 | Hennig | |
| 2,886,615 A | 5/1959 | Lindahl | |
| 2,920,123 A | 1/1960 | Oldershaw et al. | |
| 2,921,100 A | 1/1960 | Pettyjohn et al. | |
| 2,956,864 A | 10/1960 | Coberly | |
| 2,967,205 A | 1/1961 | Coberly | |
| 3,024,094 A | 3/1962 | Coberly | |
| 3,093,697 A | 6/1963 | Kasbohm et al. | |
| 3,156,733 A | 11/1964 | Happel et al. | |
| 3,156,734 A | 11/1964 | Happel | |
| 3,796,768 A | 3/1974 | Starzenski et al. | |
| 4,176,045 A | 11/1979 | Leftin et al. | |
| 4,200,682 A | 4/1980 | Sederquist | |
| 4,256,565 A | 3/1981 | Friedman et al. | |
| 4,264,435 A | 4/1981 | Read, Jr. et al. | |
| 4,461,843 A * | 7/1984 | McGarry et al. | 501/102 |
| 4,536,603 A | 8/1985 | Sprouse et al. | |
| 4,748,138 A | 5/1988 | Watanabe et al. | |
| 4,754,095 A | 6/1988 | Coughenour et al. | |
| 4,929,789 A | 5/1990 | Gupta et al. | |
| 4,973,777 A | 11/1990 | Alagy et al. | |
| 5,068,486 A | 11/1991 | Han et al. | |
| 5,138,113 A | 8/1992 | Juguin et al. | |
| 5,723,393 A | 3/1998 | Majumdar et al. | |
| 5,886,056 A | 3/1999 | Hershkowitz et al. | |
| 5,935,489 A | 8/1999 | Hershkowitz et al. | |
| 5,976,352 A | 11/1999 | Busson et al. | |
| 6,027,635 A | 2/2000 | Busson et al. | |
| 6,076,487 A | 6/2000 | Wulff et al. | |
| 6,228,293 B1 | 5/2001 | Kriegsmann et al. | |
| 6,287,351 B1 | 9/2001 | Wulff et al. | |
| 6,322,760 B1 | 11/2001 | Busson et al. | |
| 6,365,792 B1 | 4/2002 | Stapf et al. | |
| 6,575,147 B2 | 6/2003 | Wulff et al. | |
| 6,632,351 B1 | 10/2003 | Ngan et al. | |
| 6,930,066 B2 | 8/2005 | Subramanian | |
| 7,049,477 B2 | 5/2006 | Chae et al. | |
| 7,288,127 B1 | 10/2007 | Wulff et al. | |
| 7,348,287 B2 | 3/2008 | Mechnich | |
| 7,482,502 B2 | 1/2009 | Brown et al. | |
| 7,731,776 B2 | 6/2010 | Chun et al. | |
| 7,815,873 B2 | 10/2010 | Sankaranarayanan et al. | |
| 7,976,797 B2 * | 7/2011 | Chun et al. | 422/630 |
| 2002/0020113 A1 | 2/2002 | Kennedy et al. | |
| 2003/0105172 A1 | 6/2003 | Bowe et al. | |
| 2003/0109372 A1 | 6/2003 | Hasegawa et al. | |
| 2006/0273005 A1 | 12/2006 | Love et al. | |
| 2007/0144940 A1 | 6/2007 | Hershkowitz et al. | |
| 2007/0191664 A1 | 8/2007 | Hershkowitz et al. | |
| 2008/0300438 A1 | 12/2008 | Keusenkothen et al. | |
| 2009/0008292 A1 | 1/2009 | Keusenkothen et al. | |
| 2009/0250377 A1 * | 10/2009 | Chun et al. | 208/113 |
| 2010/0288617 A1 | 11/2010 | Hershkowitz et al. | |
| 2010/0290978 A1 * | 11/2010 | Chun et al. | 423/445 R |
| 2010/0292522 A1 * | 11/2010 | Chun et al. | 585/648 |

FOREIGN PATENT DOCUMENTS

| | | | |
|---|---|---|---|
| CA | 306 263 | | 12/1930 |
| EP | 1 386 665 | | 2/2004 |
| FR | 841 410 | | 2/1939 |
| FR | 1 588 738 | | 4/1970 |
| FR | 2 894 957 | | 6/2007 |
| GB | 763675 | | 12/1956 |
| GB | 830 574 | | 3/1960 |
| GB | 855 764 | | 12/1960 |
| GB | 972153 | | 10/1964 |
| GB | 1064447 | | 4/1967 |
| GB | 1149798 | | 4/1969 |
| GB | 2 216 546 | | 10/1989 |
| GB | 959818 | | 6/1994 |
| JP | 52102308 | * | 8/1977 |
| JP | 06-128033 | | 5/1994 |
| JP | 07097259 | * | 4/1995 |
| JP | 11292624 | * | 10/1999 |
| JP | 2005-314144 | | 11/2005 |
| RU | 2 249 570 | | 1/2004 |
| WO | WO 01/70913 | | 9/2001 |
| WO | 2004-087609 | | 10/2004 |
| WO | 2007-075945 | | 7/2007 |
| WO | 2009-126357 | | 10/2009 |

OTHER PUBLICATIONS

Bixler, G.H. et al. "*Wulff Process Acetylene*", Journal of Industrial and Engineering Chemistry, Washington, D.C., 45, pp. 2596-2606 (1953).

Bogart, M.J.P. et al., "*Recent Developments in Wulff Acetylene*", Chemical Engineering Progress, 50, pp. 372-375 (1954).

Bogart, M.J.P. et al., "*The Wulff Process for Acetylene from Hydrocarbons*", Petroleum Processing, 8, pp. 377-382 (1953).

Garifzyanova, G.G. et al., "*Pyrolysis of Vacuum Resid by the Plasma Chemical Method,*" Chemistry and Technology of Fuels and Oils, vol. 42, No. 3, pp. 172-175 (2006).

Holmen, A. et al., "*Pyrolysis of natural gas: chemistry and process concepts*", Fuel Processing Technology, 42, Elsevier Science B.V., pp. 249-267 (1995).

Jennings, R.J.S., "*Organic Chemicals from Natural Gas-I*", Chemical & Process Engineering, 33, pp. 243-246 (1952).

Kinney, C.R. et al. "*On the Mechanism of Carbonization of Benzene, Acetylene and Diacetylene at 1200°C*", Proc. $4^{th}$ Carbon Conference, Pergamon Press, pp. 301-313 (1960).

Sherwood, V.P.W. et al., "*Acetylene from Natural Gas and Petroleum*", Erdoel und Kohle 7, pp. 819-822 (1954).

Sneddon, R., "*Successful Acetylene Synthesis*", The Petroleum Engineer, 26, pp. C5-C8 (1954).

Weaver, T. "*Economics of Acetylene by Wulff Process*", Processing Engineering, Chemical Chemical Engineering Progress. 49, pp. 35-39 (1953).

Wen-Cheng, J. Wei et al., "*Mechanical and Thermal Shock Properties of size Graded MgO-PSZ Refactory*", Journal of the European Ceramic Society, vol. 20, pp. 1159-1167 (Jan. 1, 2000).

Zender, H.H. et al., "*ZrO2 Materials for Application in the Ceramics Industry*", Interceram, Schmid, Freiburg, De, vol. 39, No. 6, Jan. 1, 1990.

Basu, B. et al., "*Microstructure-toughness-wear relationship of tetragonal zirconia ceramics*", Journal of the European Ceramic Society, Elsevier Ltd., vol. 24, pp. 2031-2040 (2004).

Lee, S.Y. "*Sintering behavior and mechanical properties of injection-molded zirconia powder*", Ceramics International, Elsevier Ltd., vol. 30, Issue 4, pp. 579-584 (2004). Abstract retrieved from the Internet:< URL: http://www.sciencedirect.com/science> on May 1, 2008.

Moskovits, M. et al, "*Sintering of bimodal Y2O3-stabilized zirconia powder mixtures with a nanocrystalline component*", Nanostructured Materials, Elsevier Science Ltd., vol. 11, Issue 2, pp. 179-185 (1999). Retrieved from the Internet: <http://www.sciencedirect.com/science> on Jul. 23, 2008.

Natt-Alt, B. et al., "*Thermal conductivity of highly porous zirconia*" Journal of the European Ceramic Society, Elsevier Ltd., vol. 26, Issue 16, pp. 3567-3574 (2006). Retrieved from the Internet:<URL:http://www.sciencedirect.com/science> on May 1, 2008.

Ovid'Ko, I.A. et al., "*Plastic Deformation and Fracture Processes in Metallic and Ceramic Nanomaterials with Bimodal Structures*", Rev. Adv. Mater. Sci. vol. 16 pp. 1-9 (2007).

Vaβen, R. et al., "*Toughening of sic ceramics by a bimodal grain size distribution produced by hiding ultrafine and coarse grained SiC powers*", Nanostructured Materials, Elsevier, vol. 6, No. 5, pp. 889-892(4) (1995). Retrieved from the Internet:<URL:http://www.ingentaconnect.com> on May 1, 2008.

Auerkari, P., Mechanical and Physical Properties of Engineering Alumina Ceramics, Technical Research Centre of Finland, 1996, pp. 1-26.

Ries, H.C., "Acetylene", Process Economics Program, Stanford Research Institute, Report No. 16, Menlo Park, CA, Sep. 1966, pp. 1-403.

China and the Japanese Petrochemical Industry, Chemical Economy and Engineering Review, Jul./Aug. 1985, vol. 17, No. 7.8 (No. 190), pp. 47-48.

Document retrieved from the Internet <http://www.fischer-tropsch.org/primary documents/gvt reports/B I O S/1038/b1038 toc.htm.
Wei Wen-Cheng J. et al., "Processing Character of Mg0—PSZ in Size Grading Prepared by Injection Molding", Journal of the European Ceramic Society, vol. 18, Dec. 1998, pp. 2107-2116.

* cited by examiner

HEAT STABLE FORMED CERAMIC, APPARATUS AND METHOD OF USING THE SAME

FIELD OF THE INVENTION

This invention pertains to ceramic components, methods, and thermal reactor apparatus using the same, demonstrating improved physical and chemical stability in high temperature applications, facilitating improved process reliability and equipment durability. In some embodiments, the components may have particular utility in reactors such as may be used for thermally cracking or converting hydrocarbons, or for performing other high temperature chemical reactions. The invention includes refractory grade ceramic components that demonstrate improved strength, toughness, chemical stability, and thermal stability at high temperatures, such as above 1500° C., as compared to prior art refractory grade ceramics.

BACKGROUND OF THE INVENTION

Conventional steam crackers are a common tool for cracking volatile hydrocarbons, such as ethane, propane, naphtha, and gas oil. Similarly, other thermal or pyrolysis reactors, including reverse flow and other regenerative reactors, are also known for cracking hydrocarbons and/or executing thermal conversions and chemistry processes, including some processes that may be performed at temperatures higher than can suitably be performed in conventional steam crackers. Higher temperature reactions and processes typically require more complex, costly, and specialized equipment to tolerate the intense heat and physical stress conditions, with equipment temperature, strength, and toughness limitations commonly defining upper limits for many of the processes and facilities.

In an exemplary thermal processing example, the known art discloses that to efficiently obtain relatively high yields of acetylene from thermal processing of methane feed, such as in excess of 75 wt %, reactor temperatures are required to be in excess of 1500° C. and preferably in excess of 1600° C., with relatively short contact times (generally <0.1 seconds). It is known that acetylene may be thermally manufactured from methane in relatively small amounts or batches, using high temperature and short contact time in cyclical processes, yielding a mixture of acetylene, CO, and $H_2$. Methane cracking processes, however, have been inefficient compared to other commercial processes for generation of acetylene and as compared to other cracking processes such as conventional steam cracking to produce olefins. Commercially, acetylene is typically generated by cracking feeds other than methane. The high temperature processes (e.g., >1500° C.) have traditionally not scaled well and are generally only useful for relatively high-cost, specialty applications. Processes such as thermally cracking methane to acetylene have largely been commercially unattractive due to thermal, chemical, and mechanical degradation of the reactor and related equipment. In addition to physical temperature limitations for reactor materials, many prior art reactor materials that are inert at lower temperatures may become susceptible to chemistry alterations at high temperature, leading to premature equipment degradation and/or process interference, such as by generation of contaminants. Although regenerative pyrolysis reactors are generally known in the art as capable of converting or cracking hydrocarbons, they have not achieved commercial or widespread use, due at least in part to the fact that they have not been successfully scaled well to a commercially economical size or commercially useful life span. These drawbacks have resulted in use of compromised or alternative solutions, such as in the above example, commercial acetylene production is primarily accomplished via processing higher weight hydrocarbons such as ethane, propane, naphthas, and gas-oils at lower temperatures, such as by conventional steam crackers.

Further complicating the material stability and reliability issue has been exposure to large, cyclic temperature swings encountered during many pyrolysis processes. Such temperature changes and product flow direction changes can impose severe physical strength and toughness demands upon the refractory materials at high temperature. Material life expectancy at high temperature can be severely limited or precluded. Such physical demands have also typically limited manufacturing and use of refractory materials to relatively simple shapes and components, such as bricks, tiles, spheres, and similar simple monoliths. Reactor component functions and shapes have been limited for high severity services. For example, a deferred combustion, regenerative reactor process was proposed in a U.S. patent application filed Dec. 21, 2006, Ser. No. 11/643,541, entitled "Methane Conversion to Higher Hydrocarbons," related primarily to methane feedstocks for pyrolysis systems. Although the disclosed process of the '541 application effectively controls the location of combustion within the reactor, the internal reactor components must still contend with the severely high temperatures, temperature changes, and physical stresses incurred during methane pyrolysis, particularly for a commercially desirable reactor life term. The refractory material comprising the reactive regions may typically be a ceramic or related refractory material. In some embodiments, however, the disclosed processes and apparatus may utilize relatively complex shaped refractory components, such as a thin-walled honeycomb monolith used to conduct process fluids through the reactor. Such reactors and reactor component geometries may demand materials that have strength, toughness, chemical inertness, and other required properties that exceed the capabilities of previously identified or known refractory materials under such temperature and stress conditions.

For further example, the "Wulff" process represents one of the more preferred commercial processes for generation of acetylene. Wulff discloses a cyclic, regenerative furnace, preferably including stacks of Hasche tiles (see U.S. Pat. No. 2,319,679) as the heat exchange medium. However, such materials have demonstrated insufficient strength, toughness, and/or chemical inertness, and are not amenable to use as certain desirable reactor components, such as for use as reactor fluid conduits, to facilitate large-scale commercialization. Although some of the "Wulff" art disclose use of various refractory materials, a commercially useful process for methane cracking or other extreme high-temperature processes (e.g., >1500° C., >1600° C., and even >1700° C.) has not previously been achieved utilizing such materials. The aforementioned practical obstacles have impeded large scale implementation of the technologies. Materials availability for high temperature, high-stress applications is one of the most critical issues in design and operation of large-scale, commercial, high-productivity, thermal reactors.

Due to high temperatures involved in cyclic pyrolysis reactors, generally only ceramic components have the potential to meet the materials characteristics needed in such aggressive applications. The American Society for Testing and Materials (ASTM) defines a ceramic article as "an article having a glazed or unglazed body of crystalline or partly crystalline structure, or of glass, which body is produced from essentially inorganic, non-metallic substances and either is formed from a molten mass which solidifies on cooling, or is formed and simultaneously or subsequently matured by the action of the heat." Ceramics components generally can be categorized in three material categories: engineering grade, insulation grade, and refractory grade.

The term "engineering grade" has been applied to ceramic materials which typically have very low porosity, high density, relatively high thermal conductivity, and comprise a complete component or a lining. Examples include dense forms of aluminum oxide ($Al_2O_3$), silicon nitride ($Si_3N_4$), silicon carbide (SiC), silicon aluminum oxynitride (SIALON), zirconium oxide ($ZrO_2$), transformation-toughened zirconia (TTZ), transformation-toughened alumina (TTA), and aluminum nitride (AlN). These materials usually possess high strength and toughness, which have been dramatically improved to the degree that ceramics are now available that can compete with metals in applications previously thought impossible for ceramics. Strength is a measurement of the resistance to formation of a crack or structural damage in the material when a load is applied. Toughness is a measurement of the resistance of the material to propagation of a crack or extension of damage to the point of failure. For instance, engineering grade $Al_2O_3$ and SiC are commercially available with a strength of over 345 MPa, and $Si_3N_4$ and TTZ are available with strengths above 690 MPa (100 kpsi). Some TTZ materials have toughness around 15 MPa·m$^{1/2}$, which is an order of magnitude higher than that of conventional ceramics. Even though engineering grade ceramics have superior strength and toughness at relatively low temperatures, they are relatively poor in thermal shock resistance (both strength and toughness) and many grades, such as but not limited to borides, carbides, and nitrides are not chemically stable at high temperature. Many are also not suitable for use at the high temperatures encountered with some pyrolysis reactions.

The second category of ceramic materials is insulation grade ceramics, which are typified by relatively high porosity. Many may have fibrous crystalline grain structures and are more porous than engineering grade ceramics, have lower density, and have lower thermal conductivity than engineering grade ceramics. Insulating monolithic ceramics and composite ceramics are often fabricated into various forms such as rigid boards, cylinders, papers, felts, textiles, blankets, and moldables. Many are primarily used for thermal insulation at elevated temperatures, such as up to 1700° C. A broad range of porosities and pore sizes can be produced, depending on the intended application, but in general, insulation grade ceramics tend to be relatively porous as compared to engineering grade ceramics. Porous ceramics have many open or closed internal pores that provide the thermal barrier properties. Often, quite porous ceramics, such as those having porosity of greater than 50 vol. % and commonly even in excess of 90 vol. %, are used for thermal insulation where extremely low thermal conductivity (<0.08 W/m·K) is required. However, insulation grade ceramics typically lack the structural strength and functional toughness needed for the internal components of many pyrolysis reactors and processes. Insulation grade ceramics typically are recognized as having a flexural strength or toughness of less than about 4 Kpsi (27.6 MPa) and often of less than even 1 Kpsi (6.9 MPa). Also, the insulation properties of porous ceramics may tend to degrade as the pores may fill with coke accumulation.

The third generally recognized category of ceramic materials is refractory grade ceramics. Many refractory grade ceramics typically have porosity, strength, and toughness properties intermediate to such properties in engineering grade and insulation grade. Refractory grade ceramics typically have thermal shock resistance properties similar to some insulation grade ceramics but higher than engineering grade ceramics. Conversely, refractory grade ceramics typically lack the strength and toughness of engineering grades ceramics, but which properties exceed those of insulation grade ceramics. However, typically as strength increases, thermal shock resistance and related properties are compromised.

All relevant properties must be considered when selecting a ceramic for a particular application. Other relevant ceramic properties or characteristics include but are not limited to maximum use temperature, thermal conductivity, modulus of rupture, modulus of elasticity, electrical resistance, average grain size, density, porosity, and purity. The maximum use temperature is the highest temperature to which refractory ceramics can be exposed without degradation. Thermal conductivity is the linear heat transfer per unit area for a given applied temperature gradient. The modulus of rupture (MOR) or cross-break strength is the maximum flexural strength that refractory ceramics can withstand before failure or fracture occurs. Young's modulus or the modulus of elasticity is a material constant that indicates the variation of strain produced under an applied tensile load. Average grain size measures the size of individual grains or crystals within the microstructure of a polycrystalline ceramic material. Density is the mass per unit of bulk volume. Purity is the percentage, by weight, of major constituents.

As compared to insulation grade ceramics, refractory grade ceramics tend to be stronger across broader temperature ranges. Refractory grade ceramics also generally tend to be more resistant to thermal shock than engineering grade ceramics. However, while some refractory grade ceramics tend to be somewhat inert or chemically stable at elevated temperatures, some refractory grade ceramics become chemically and/or structurally unstable at elevated temperatures, rendering them unsuitable for applications exposed to chemical reactions. Exemplary chemically and/or thermally unstable ceramics include certain silicas, aluminas, borides, carbides, and nitrides. Also, some refractory grade ceramics are known to possess lower thermal conductivities and coefficients of expansion than certain other refractory or engineering grade ceramics. Refractory grade ceramics are also known to undergo alterations in crystalline structure at elevated temperatures. Such alterations can result in changes in bulk volume which can result in production of stress fractures and/or cleavage planes which can reduce the material's strength. Some exemplary, common high temperature refractory grade materials include but are not limited to magnesia (MgO), lime (CaO), and zirconia ($ZrO_2$).

Some engineering grade alumina or zirconia ceramics may provide superior flexural strength, but their thermal shock resistance is poor. Some advanced engineering ceramics, such as SiC and $Si_3N_4$, also provide superior strength, but their thermal shock resistance in grossly inadequate. Moreover, these silicon based ceramics can not be used at high temperatures (i.e. >1500° C.) due to high temperature oxidation issue. On the other end of the spectrum lie the insulation grade ceramics. These ceramics offer excellent thermal shock resistance, but they fall quite short of the required strength performance.

The reviewed art is void of teaching how to prepare or select a material having a range of properties that are suitable for use in constructing a furnace for performing substantially continuous, cyclical, high temperature pyrolysis chemistry. Also, materials testing methods commonly applied to metals and polymers are frequently less useful for testing ceramics. The available tests provide only a limited picture of the total performance limits of any particular ceramic. Further complicating the ceramic material selection process is the complicating fact that, like metals and polymers, the performance of a ceramic is also a function of temperature, with temperature-dependent changes in properties such as brittleness, elastic, plastic and viscoplastic deformation, hardness, fatigue, corrosion resistance, and creep resistance. Other important performance factors include but are not limited to thermal shock resistance, thermal expansion, elastic modulus, thermal conductivity, strength, and fracture toughness.

The identified prior art pertaining to refractory materials for high-severity hydrocarbon pyrolysis dates primarily to the 1960's and earlier. However, that art merely occasionally provides generalized lists of some exemplary materials such as ceramics, alumina, silicon carbide, and zircon as reactor materials. These sparse, non-specific disclosures left the art largely incapable of providing a large-scale, commercially useful reactor or reactor process. The teachings of the art was only effective for enabling relatively small scale specialty applications that see vastly inferior use as compared to large scale processes such as hydrocarbon steam cracking. The identified art is void of teaching or providing a refractory ceramic material that has the complex set of properties that are required for extended use in the reactive or other most-demanding regions of a high-severity ($\geqq 1500°$ C.) pyrolysis reactor for the commercial production of acetylene and/or olefins. The studied art does not teach preferred crystalline structure or composition for particular reactor furnace uses, or for complex reactor component shapes and/or functions. Multi-modal ceramics are also known in the art, as are ceramic compositions utilizing nanoparticles. However, specific formulations or teachings for refractory materials having particular utility in high temperature (>1500° C.), high stress, chemically active, thermal reactor applications have not been identified or located in the known art. The studied art is believed to be similarly deficient at teaching materials suitable for complex, irregular, or functionally-shaped reactor components. The art needs a material (e.g., ceramic) that can endure prolonged exposure to high severity temperatures, substantial temperature swing cycles, cyclic flows of combustion and reaction materials, and concurrently provide the needed structural integrity, crystalline stability, relatively high heat transfer capability, and chemical inertness in the presence of high temperature chemical reactions that is required for large scale, high productivity applications. Lack of materials availability and selection criteria for identifying the materials for use in the reactive and most severe temperature regions of a reactor system is one of the most critical remaining issues in design and large-scale commercial operation of such reactors and processes.

SUMMARY OF THE INVENTION

The invention includes, but is not limited to a formed ceramic component and a pyrolysis reactor, including but not limited to processes related thereto. The unique combination of multimodal grains, composition of the grains, and taught porosity range disclosed herein is believed to provide an inventive material or component that differs from anything previously known or taught in the art. Though not necessarily required as a limitation, it is further believed that such herein described materials or components will demonstrate a flexural strength of at least 6 kpsi. It is further believed that such herein described material or component will demonstrate a normalized thermal shock resistance rating of at least four, as described below. It is believed that the disclosed combination of the components and related physical properties has been lacking in various pyrolysis industries and has particular utility and application therein, as well as in other areas of technology.

In one aspect, the invention includes a heat stable, formed ceramic component that includes a multimodal grain distribution including (i) at least 50 wt % of coarse grains including stabilized zirconia, the coarse grains comprising a D50 grain size in the range of from 5 to 800 µm, based upon the total weight of the component; and (ii) at least 1 wt % of fine grains comprising a D50 average grain size not greater than one-fourth the D50 grain size of the coarse grain, dispersed within the coarse grains, based upon the total weight of the component; wherein after sintering, the component has porosity at ambient temperature in the range of from 5 to 45 vol. %, based on the formed volume of the component. In another aspect, the fine grains include at least one of (i) a stabilized zirconia, (ii) a stabilizer, and (iii) mixtures thereof.

In some embodiments, the inventive formed ceramic components include a flexural strength (modulus of rupture, MOR) of at least 6 kpsi and a normalized thermal shock resistance rating of at least four (4). In other embodiments, the inventive formed ceramic components may include an MOR of at least 6 kpsi, while still other embodiments may include an MOR of at least 10 kpsi. The inventive components may also include a normalized thermal shock resistance rating of at least four (4) and preferably at least five (5).

In other aspects the invention includes a thermal pyrolysis reactor for pyrolyzing a feedstock, such as but not limited to a hydrocarbon, such as but not limited to an alkane, an alkene, an aromatic, and/or coal, the reactor comprising: a multimodal ceramic component including at least a fine grain mode and a coarse grain mode, the coarse grain mode comprising stabilized zirconia and the fine grain mode comprising a stabilized zirconia and/or a stabilizer, such as but not limited to a metal oxide stabilizer; wherein after sintering, the component includes (i) porosity at ambient temperature in the range of 5 to 45 vol %, based on the volume of the component. In some embodiments the reactor includes a multimodal ceramic component that comprises a flexural strength of at least 6 kpsi, and a normalized thermal shock resistance rating of at least four. In some aspects, the multimodal ceramic component comprises; (i) at least 50 wt % of the coarse grains including stabilized zirconia, the coarse grains including a D50 grain size in the size range of from 5 to 800 µm, based upon the total weight of the component; and (ii) at least 1 wt % of a fine grains including stabilized zirconia, the fine grains including a D50 grain size in the range of 0.01 to 44 µm dispersed within the coarse grain mode, based upon the total weight of the component.

In other embodiments, the invention includes a process for the manufacture of a hydrocarbon pyrolysis product from a hydrocarbon feed using a regenerative pyrolysis reactor system, comprising the steps of: (a) heating a pyrolysis reactor comprising a bi-modal stabilized zirconia ceramic component to a temperature of at least 1500° C. to create a heated reactive region, wherein after exposing the component to a temperature of at least 1500° C. for two hours the component has a bulk porosity measured at ambient temperature in the range of from 5 to 45 vol. %, based on the bulk volume of the component; (b) feeding a hydrocarbon feed to the heated pyrolysis reactor to pyrolyze the hydrocarbon feed and create a pyrolyzed hydrocarbon feed; and (c) quenching the pyrolyzed hydrocarbon feed to produce the hydrocarbon pyrolysis product.

In yet other embodiments, the invention includes a process for preparing a thermal reactor comprising the steps of: (a) preparing a ceramic component comprising bimodal, stabilized zirconia; and (b) sintering the ceramic component at a temperature of at least 1500° C.; (c) providing the sintered ceramic component in a reactive region of a thermal reactor; wherein after the sintering, the ceramic component reactive region component comprises a bulk porosity measured at ambient temperature in the range of from 5 to 45 vol. %, based on the bulk volume of the component, and preferably include a flexural strength (modulus of rupture, MOR) of at least 6 kpsi and preferably include a normalized thermal shock resistance rating of at least four. More preferably, the normalized thermal shock resistance rating is at least five. More preferably, the MOR is at least 10 kpsi.

DETAILED DESCRIPTION

Figure 1:
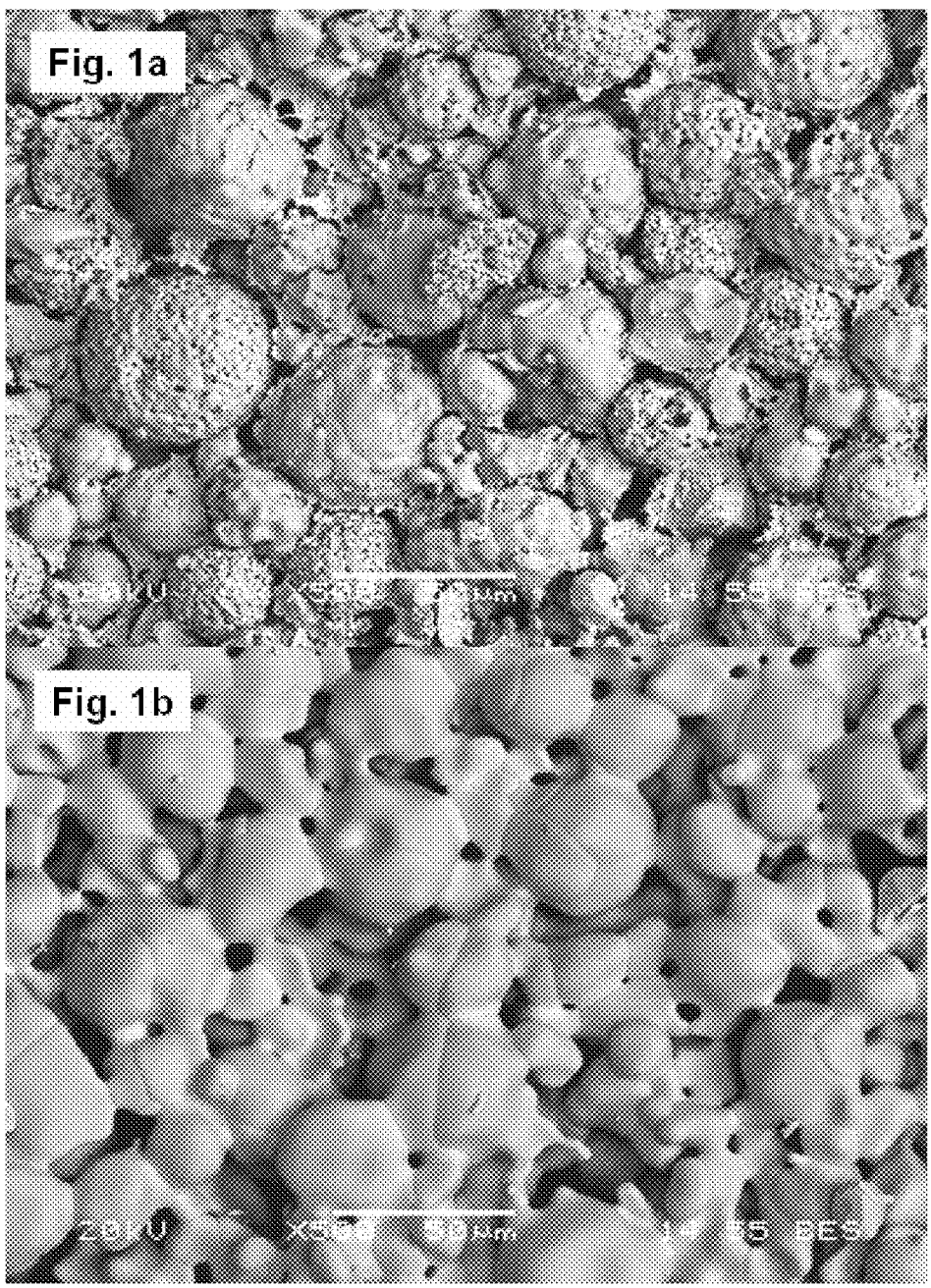
FIG. 1 illustrates an SEM photograph of a sintered (FIG. 1a) and annealed (FIG. 1b) exemplary, multimodal ceramic component according to the present invention.

The present invention relates to components, apparatus, and processes related to heat stable ceramics and uses for the same. In one aspect, the invention relates to components, apparatus, and processes having particular application for use with high temperature (e.g., >1500° C.) reactors, and in another more particular aspect having application for use with pyrolysis reactors for performing high temperature chemistry, conversions, cracking, and/or thermal pyrolysis of feeds such as but not limited to hydrocarbons. The inventive aspects include ceramic components and apparatus using the same that may have chemical and/or physical performance properties that exceed one or more of such properties of prior art engineering grade, insulation grade, and/or refractory grade ceramic components. In still other embodiments, the inventive components, materials, apparatus, and processes may have particular utility that facilitates large-scale commercialization of high temperature pyrolysis conversion processes. Exemplary suitable processes may include but are not limited to high-temperature pyrolysis reactor conversion of methane feed to acetylene or olefins, and coal gasification processes. Exemplary suitable apparatus may include but are not limited to pyrolysis reactors, reverse flow reactors, regenerative reactors, deferred combustion reactors, gasification reactors, and steam cracking reactors or furnaces. Exemplary inventive components may include but are not limited to reactor components, parts, or apparatus that feature engineered or otherwise particularly designed shapes, functions, configurations, intricacies, or irregular geometries that may be exposed to high temperatures (e.g., >1500° C.).

Various chemical and thermal processing apparatus and methods that operate at temperatures in excess of 1500° C. are known and described in the art. However, due to the severe temperature and corresponding physical, chemical and thermal stress imposed upon such equipment and materials, many of such previously known processes and apparatus only enjoy limited commercialization, limited economy of scale, relatively high cost, and compromised life expectancy.

The present invention pertains to improved ceramic materials, apparatus and processes that may expand or improve upon one or more aspects of the previously known materials, apparatus, and processes. For example, in some aspects the subject invention may provide for improved combinations of flexural strength, normalized thermal shock resistance, and chemical stability at high temperature, as compared to such collective properties of previous components. Such improvements may thereby facilitate improved component life expectancy, strength, manufacturing options and function. Such improvements may in turn be able to lead to improved process and apparatus economics and large-scale commercialization of processes and apparatus that were previously technically and/or economically disadvantaged. The inventive materials and components may also facilitate manufacture or use of relatively intricate components, such as but not limited to thin-walled honeycomb monoliths, and which may facilitate corresponding process improvements.

In one aspect, the invention provides for ceramic components that may have improved combinations of strength, toughness, thermal shock resistance, and/or chemical stability as compared to known prior art ceramics. Such improved combination of properties may be attributable at least in part to one or more of the combination of various factors, such as but not limited to, the multimodal particle sizes and distribution, particle arrangement, particle material selection, degree of stabilization, manufacturing methods and techniques used, resultant porosity, sintering, and/or the presence or absence of various secondary components such as oxides and metals. The inventive ceramic components may be provided, for example, in one or more regenerative reactor beds that are useful for carrying out a high temperature chemical reaction. The inventive ceramic components may be used in construction of one or more reactor embodiments, components, or regions of the reactor system, and may be of substantially any suitable geometry, form or shape, such as but not limited to spheres, beads, honeycomb materials, tubes, extruded monoliths, bricks, tiles, and other molded or formed components that are exposed to the extreme temperatures. The improved strength and inertness properties of the materials of the subject invention may provide for a wider range of component geometries and function than was previously available in the art. In one aspect the inventive components may comprise zirconia ($ZrO_2$).

Zirconia is a crystalline material that undergoes a change at different temperatures in the way its atoms are stacked (polymorphic transformation). Pure zirconia has a monoclinic crystal structure between room temperature and about 950° C. Above about 950° C., zirconia converts to a tetragonal crystal structure. This transformation is accompanied by greater than one percent volumetric shrinkage during heating and equivalent expansion during cooling. At a still higher temperature the pure zirconia changes from tetragonal to a cubic structure. These volumetric changes associated with alterations in crystalline structure can produce crystalline fractures or cleavages along grain boundaries. In pure polycrystalline zirconia, this tetragonal-monoclinic transition results in a reduction in strength and potential catastrophic failure of the component.

Additionally, if desired for some embodiments, the reactor system may also comprise other refractory materials in addition to the zirconia ceramic components of the subject invention, such as in reactor regions that are not exposed to the most severe temperatures, e.g., materials such as glass or ceramic beads or spheres, metal beads or spheres, ceramics, ceramic or metal honeycomb materials, ceramic tubes, extruded monoliths, and the like, provided they are competent to maintain integrity, functionality, and withstand long term exposure to the relevant temperatures and stresses experienced in the respective reactor region.

Chemical addition of at least one mole percent (one weight percent) of one or more of CaO, MgO, $Y_2O_3$, $CeO_2$ or mixtures thereof to the zirconia, based upon the total weight of the coarse grain stabilized zirconia and such additive, may result in formation of a cubic crystal structure that is more crystalline-stable over the complete temperature range and does not undergo a phase transformation. Such zirconia, including at least one mole percent of one or more of CaO, MgO, $Y_2O_3$, $CeO_2$ or mixtures thereof added to the zirconia, based upon the total weight of coarse grain zirconia and such additive shall be referred to in this specification and the claims appended hereto as "stabilized zirconia." CaO, MgO, $Y_2O_3$, $CeO_2$ or mixtures thereof are referred to herein as "stabilizers." A stabilized zirconia thereby includes at least one mole percent of stabilizer, in other embodiments at least two mole percent of stabilizer, and in other embodiments a stabilized zirconia may include at least four mole percent of such stabilizer. For example, addition of about 16~27 mole percent CaO into $ZrO_2$ (zirconia) generally fully stabilizes the zirconia and makes the structure cubic over the relevant, broad temperature range. Other stabilizers require varying percentages of stabilizer to fully stabilize a zirconia. For further example, about 7 mole percent of $Y_2O_3$ into the $ZrO_2$ provides a cubic crystalline structure that is stable over the relevant temperature range, such as up to 2260° C. As a still further example, the critical concentration of MgO is about 12 mole percent. In yet another example, a stabilized zirconia may include a fraction of a percent of at least one of such stabilizer and another fraction of a percent of another of such stabilizer, such that the combined fractions make up at least one mole percent of the total weight of the zirconia and such additive.

Zirconia containing sufficient stabilizer to render complete or substantially complete crystallization shift to cubic structure or a zirconia having an excessive amount of stabilizer is considered a "fully stabilized zirconia." In contrast, addition of less stabilizer than the amount required to create a fully cubic-crystalline Zirconia structure renders the zirconia structure a mixture of cubic and monoclinic phases and/or cubic and tetragonal crystal phases. Zirconia containing such limited amount of stabilizer additive such that there remains at least more than an incidental amount of monoclinic and/or tetragonal crystals, is referred to as "partially stabilized zirconia." The term partially stabilized zirconia is thus defined to include substantially any stabilized zirconia that has at least one mole percent of stabilizer but an insufficient amount of stabilizer to render a fully cubic-crystalline zirconia over the relevant, broad temperature range.

The exact division between fully and partially stabilized can be a relative term, as depicted in phase diagrams of the mixed components as a function of temperature, and is sometimes difficult to precisely discern due to factors such as incomplete stabilizer dispersion or mixing, or the presence of other non-stabilizing contaminants. For purposes of this invention, it may be considered that as the percentage of stabilizer increases from roughly none present toward an increasing stabilizer presence and corresponding increased stabilization toward full stabilization, the key strength and toughness properties generally tend to improve through the partial stabilization range. However, at some point approaching substantially complete cubic crystallization or full stabilization, these important strength and toughness properties may tend to degrade somewhat across a broad temperature spectrum as compared to such properties in a partially stabilized zirconia that has a mixture of cubic, monoclinic, and/or tetragonal crystals. However, depending upon the application, the fully or more-fully stabilized zirconia may still be useful for the intended application, while for many other applications the generally still tougher and more fracture-resistant partially stabilized zirconia will be preferable. In addition to degree of stabilization, the stabilized zirconia's performance may also be affected to varying degrees by other factors, such as particle/grain size, particle/grain distribution, packing density, processing additives, and other factors. As used herein, the term "particle" generally may be used interchangeably with the term "grain," as the term particle typically references the feed materials prior to sintering, while the term grain typically references the particles after sintering, although such term distinction is not necessary to describe the invention, as both terms generally refer to analogous elements.

The detailed compositional ranges of fully stabilized zirconia and partially stabilized zirconia in given chemical additions of CaO, MgO, $Y_2O_3$ or $CeO_2$ to the $ZrO_2$ are known to a skilled artisan in the ceramics field and provided in the American Ceramic Society monograph entitled "Phase Diagrams for Ceramists," by Levin et. al. For substantially all stabilizer-zirconia compositions, it is generally appreciated that fully stabilized zirconia has relatively low fracture toughness and relatively less resistance to impact as compared to partially stabilized zirconia, such that for many applications partially stabilized zirconia may be preferable to fully stabilized zirconia. By adding less CaO, MgO, $Y_2O_3$ or $CeO_2$ or other stabilizer to the zirconia compound than the amount of stabilizer required to completely stabilize all of the zirconia (e.g., the ZrO2) crystals, and also preferably by careful control of particle sizing, distribution, and processing, mixtures of the stabilized cubic phase and the unstable monoclinic phase that have very high fracture toughness are achieved. This is referred to herein as a partially stabilized zirconia.

Two key materials properties are identified as having significant importance with regard to high-severity performance of ceramics in thermal process reactors and their corresponding suitability for application in large scale thermal processes; namely, thermal shock resistance and mechanical flexural strength. Other properties, such as chemical stability at high temperature and toughness are also important and must be considered when selecting an appropriate ceramic materials or components for an application.

Thermal shock resistance of a ceramic component can be defined as the maximum change in temperature that the material can withstand without failure or excessive damage. Thermal shock resistance is an evaluated parameter but not a material property. Description of thermal shock resistance may depend upon the type of thermal cycle, component geometry, and strength as well as on material properties or factors. Simplified mathematical expressions relying upon a variety of assumptions can be used to describe material performance under a set of conditions. Alternatively, much more complex analyses may be performed using numerical analysis methods such as finite element and stress-strain analysis. However, for materials performance comparison purposes a qualitative or direct comparative analysis is also useful and more practical. Thermal shock resistance may be evaluated by means of rapid water quench experiments such as illustrated in ASTM C1525. Thermal shock damage results in a material from buildup of thermal and physical stresses, usually during rapid heating or rapid cooling. The major materials factors describing thermal shock resistance are thermal expansion coefficient ($\alpha$), elastic modulus (E), thermal conductivity (k), strength ($\sigma_f$), and fracture toughness ($K_{1C}$). Thermal shock resistance is increased by decreasing $\alpha$ and E and by increasing k, $\sigma_f$, and $K_{1C}$.

For example, the ASTM C1525 thermal shock resistance test method builds on the experimental principle of rapid quenching of a test specimen (e.g., 1"×1"×⅛" square, or 2.54 cm×2.54 cm×0.32 cm square) from an elevated temperature (e.g. 1100° C.) into a water bath at room temperature. After water quenching, the specimen is dried and dye-penetrated to investigate both open and closed cracks. For instance, Zyglo® water washable dye penetrants may be used. As the zirconia samples are typically white or yellow, pink dye provides a vivid depiction of cracks and helps differentiate cracks from background or grain boundaries. Methods for determining the cumulative or total crack length per unit area in each specimen are known in the art and may be determined by scanning software electronically aggregating the lengths of all cracks, backed up with visual confirmation by the technician. The electronic scanner resolution or magnification is generally not critical, e.g., from as low as from 50× to as high as 1000×. The tester need only be able to differentiate actual cracks from mere grain boundaries. As with any specified parameter, the value determined must be made over a large enough region to provide a statistically sound representation of the entire sample. The total crack length per unit area may be determined over a sufficiently large area or by aggregating and averaging a number of smaller regions that collectively represent a statistically sound region. A whole component may be studied or one or more regions may be evaluated. The studied or relevant region(s) or the whole component may be considered a "component" for purposes herein.

Utilizing propensity of cracks observed in a test specimen, the thermal shock resistance for a particular region or component may be normalized and qualitatively scored, such as from 1 (the least resistance) to 5 (the most resistance) as summarized hereunder:

1: Open cracks and many closed cracks.

2: Many closed cracks.

3: Some closed cracks.

4: Little closed cracks.

5: No cracks.

Figure 4:
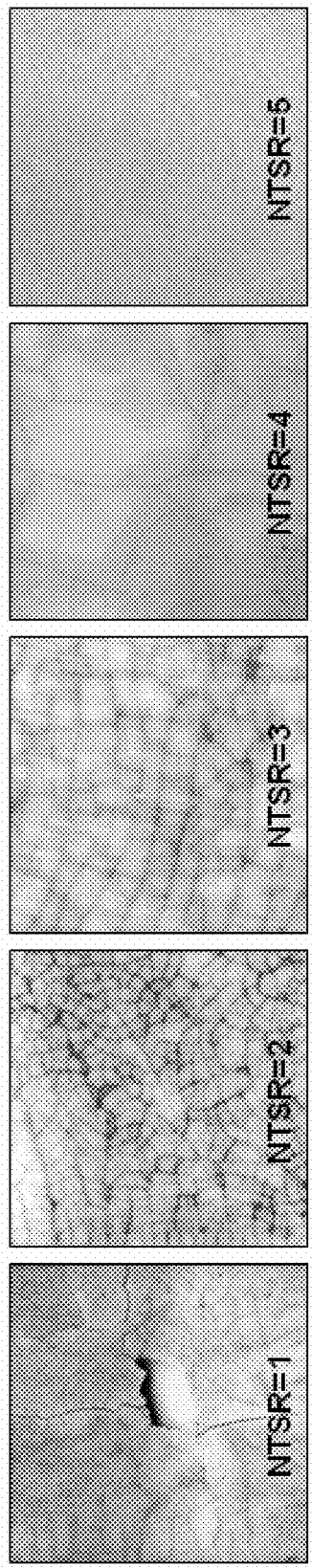
FIG. 4 provides photographic examples of stress cracking of various ceramic samples, each graded and ranked with a qualitative value from 1 to 5 to illustrate corresponding normalized thermal shock resistance.

The appearance of various degrees of cracking in rapidly quenched zirconia specimens or components and their corresponding qualitative, normalized thermal shock resistance (NTSR) value from 1 to 5 are illustrated in FIG. 4. A rating of 1 is least acceptable while a rating of 5 is most acceptable. The herein disclosed inventive compositions will typically produce a normalized NTSR rating of 3, 4, and 5. To quantify propensity of cracks observed in a thermal shock resistance test specimen, dye penetrated samples were optically scanned and subjected to an image analysis computer software program. For example, a total crack length per unit area of the test specimen may be measured by use of commercially available image analysis software, e.g., Clemex Vision PE, as reported in Table 1, and corresponding generally with the illustrative images of FIG. 4. (Other image analysis software applications are also available to similarly measure the total crack length of the specimen.)

TABLE 1

Illustrative examples of normalized thermal shock resistance (NTSR) index or rating, ranked from 1 to 5.

| NTSR Index | Measured total crack length per unit area (cm/cm²) | Criteria of total crack length (cm/cm²) |
|---|---|---|
| 1 | 81.2 | >50 |
| 2 | 25.6 | >20-≦50 |
| 3 | 16.5 | >5-≦20 |
| 4 | 3.5 | >1-≦5 |
| 5 | 0.01 | ≦1 |

The stabilized refractory grade zirconia of this invention preferably demonstrates a total crack length per unit area after quenching a test specimen of the inventive material from 1100° C. into a water bath at room temperature that is not greater than 5 cm/cm²; that is, it preferably has a NTSR of at least 4. Still more preferably, the stabilized refractory grade zirconia of this invention demonstrates a total crack length per unit area after quenching a test specimen of the stabilized refractory grade zirconia at 1100° C. into a water bath at room temperature that is preferably not greater than 1 cm/cm²; that is, more preferably has a NTSR of 5. However, for some less demanding applications, the inventive components may demonstrate crack lengths in excess of 5 cm/cm², but preferably not greater than 20 cm/cm², thus demonstrating a corresponding NTSR of 3 or higher. The intended application determines the range of acceptable crack length. An NTSR of at least 3 may be acceptable for some applications while a rating of 4 or 5 is likely most preferred for the more demanding conditions and commercial duration. A rating of 3 or less often may be presumed unacceptable for use with many cyclic high thermal stress applications. However, the inventive components have routinely demonstrated crack lengths of less than 5 cm/cm².

As set forth in ASTM C1525-04, the effect of the thermal shock can be assessed by measuring the reduction in flexural strength (MOR) produced by rapid quenching of test specimens heated across a range of temperatures. For purposes of the stabilized zirconia of this invention, regarding quantitative measurement of thermal shock resistance, a critical temperature interval may be determined by a reduction in the mean flexural strength of a determined amount, such as for example, at least 30%. However, the test does not determine thermal stresses developed as a result of a steady state temperature differences within a ceramic body or of thermal expansion mismatch between joined bodies. Further, unless the test is repeated several times, the test is limited in its ability to quantitatively determine the resistance of a ceramic material to repeated or cyclic shocks. Thus, it is preferred that the test be repeated to analyze the effect of cyclic temperature shocks, such as may be experienced in a regenerative reactor.

Flexural strength can be measured by 3-point bending tests as illustrated in ASTM F417. The test specimen, a small bar of square cross section, rests on two cylindrical supports in a compression test machine. It is bent by the application of force, at mid-span, to the opposite face of the bar from that resting on the two supports. The bending force is applied by a third cylinder (identical to the other two) at a prescribed constant rate until the specimen breaks. The breaking rod, the dimensions of the specimen, and the test span are used to calculate flexural strength.

In some embodiments the present invention may include heat stable, formed ceramic components that may be useful such as in a thermal or pyrolysis reactor. In other embodiments, the invention may include a thermal pyrolysis reactor comprising components that may be useful within the high temperature regions of such reactors. Aspects of the invention may be used for construction of various components of a reactor, such as but not limited to, components in a reactor's "heat core" or reactive region, insulation, and/or as functional components in the process, such as flow conduits, mixers, heat sinks, or quenching components, depending upon the particular process and apparatus employed. For example, in one aspect, the inventive components may be useful to define the flow-path for the reactants, mix the reactants, and store and release reaction heat that enables and is produced or consumed by the pyrolysis reactions. For purposes of the claimed invention, the reactive region includes at least a high temperature or high heat-exposed portion of the reactor and typically may include those components that are associated with the flow and interaction of reactants into and within the reactor, mixing and combustion of the reactants, storage and release of the produced heat for consumption in facilitating the pyrolysis reaction, movement of the pyrolysis feed and generated products through and from within the reactor, and with quenching the reaction products. In other embodiments, the invention may include reactor refractory or pyrolysis components whose primary function is merely to isolate, insulate, or otherwise confine the generated heat, and/or which provide mechanical support for those regions of the reactor that are directly involved in or proximate to the reaction heat.

As a ceramic material is heated, its density typically increases as a result of pore shrinkage due to the sintering effect caused by the heat. Sintering may result in some of the ceramic crystals or components therein melting or undergoing other high temperature fusion or shrinkage, resulting in a slight decrease in bulk volume, but with an increase in component strength. Thus, as a ceramic is heated, its modulus of rupture mechanical flexural strength (MOR) may typically also correspondingly increase slightly. However, when the hot ceramic is subjected to relatively quick cooling, such as via water quenching, stress fractures may be introduced thereby causing a weakening or reduction in the mechanical flexural strength. The combination of the multimodal grains and the porosity remaining after sintering results in a lattice type structure that provides the improved strength, heat stress dissipation and handling characteristics, and cyclic thermal stress resilience.

There are at least two determinations of mechanical flexural strength (MOR) that are of interest in determining the suitability of a particular ceramic with regard to the present invention. One is the MOR measured after sintering at high temperature (e.g., $\geq 1500°$ C.) and initial quenching to ambient conditions. Another MOR of interest (also measured at ambient temperature) is the MOR of the sintered component after further heating and quenching, such as via cyclic reheating and quenching. The subject inventive components demonstrate substantial retention of the claimed MOR and thermal shock resistance properties after both initial sintering and further thermal processing (e.g. "annealing", as further described below). Generally, the properties after further thermal processing (annealing) are not greater than ten percent less than such properties after initial sintering, and frequently not less than three percent less, or in some embodiments substantially the same or even higher strength and thermal shock resistance properties after annealing. However, for consistency and clarity purposes herein, the claimed MOR and thermal shock properties refers to those properties determined after initial sintering, unless stated otherwise. ASTM 1505 describes the process for MOR determination.

Exposure of the sintered component to temperatures in excess of 1500° C., such as in excess of 1600° C. or at least 1800° C., may further process the component in a manner somewhat analogous to annealing. Such further thermal processing or "annealing" may generally further improve the strength and thermal shock resistance of the inventive components and reactors over mere sintering. Examples and figures are provided below and herewith that illustrate exemplary sintered components and the same components after exposure to higher temperature for periodic durations, thereby simulating the resulting components during commercial use. Thus, in another aspect, after such "annealing" the sintered component such as through commercial use or simulated commercial use at an exemplary temperature of at least 1800° C. for two hours, the formed ceramic component demonstrates a retained porosity at ambient temperature in the range of from 5 to 45 vol. % based upon the formed volume of said component. Such components also demonstrate a flexural strength (MOR) of at least 6 kpsi, preferably at least 10 kpsi, and provide a thermal shock resistance rating of at least four (4), preferably at least five (5). The MOR flexural strength of the multimodal zirconia ceramic used for reactor components according to this invention should be greater than or equal to about 6 kpsi (41.3 MPa) after initial sintering to at least 1500° C., such as, for example, for at least 10 minutes, and subsequent quenching to ambient temperature. Also, the MOR is preferably greater than or equal to about 6 kpsi (41.3 MPa) when the sintered component is further thermally conditioned, such as by reheating and quenching (e.g., annealed) to simulated operating conditions. For example, the thermal conditioning may entail reheating the component to a temperature in a range such as from 1500° C. to 1800° C. or perhaps even up to 2000° C. Surprisingly, many of the inventive components routinely demonstrate a MOR of at least 6 kpsi (41.3 MPa) after further thermal processing. The combination of a normalized thermal shock resistance of four, with such MOR strength is recognized herein as a minimal MOR and shock resistance properties that are necessary across the required broad reactor temperature spectrum to provide for long-term commercial utilization of high temperature pyrolysis chemistry processes, over a desired life cycle of the reactor component.

A commercially sized reactor according to this invention may typically include numerous ceramic components arranged, stacked, or otherwise positioned within the reactor core and should retain mechanical integrity to accommodate such arrangement over repeated heat/quench cycles for a commercially acceptable life, such as at least one year, preferably at least two years, and more preferably at least five years. Thus, the MOR after initial sintering should be greater than or equal to about 6 kpsi, (41.3 MPa), or more preferably greater than or equal to about 8 kpsi (55.1 MPa) and even more preferably greater than or equal to about 10 kpsi (69 MPa). Some embodiments, however, will demonstrate MOR of in excess of 30 kpsi (206 MPa), while still other embodiments may demonstrate an MOR of in excess of 100 kpsi (690 MPa), each while retaining a normalized thermal shock resistance rating of at least four and preferably at least five.

With regard to MOR retention, e.g., that of retained strength after subjecting a sintered component to cyclic reheating and quenching to simulate operating conditions (e.g., referred to herein merely as "annealing" for brevity), the preferred apparatus and components according to the present invention also includes an MOR that is at least 70% of the component's initial MOR flexural strength after sintering, when measured after two hours of annealing. The annealing may be performed at any desired temperature in excess of 1500° C., preferably at a temperature and time duration that simulated operating conditions, but typically may be executed at a temperature in a range of from 1500° C. to 2000° C., such as for two hours, as demonstrated in the examples provided herein. If desired, the effect of long duration MOR changes may also be evaluated to determine commercial suitability, such as the MOR after, say for example, one month of cyclic processing (annealing). Other preferred embodiments may include a retained MOR after annealing that is at least 75% of the component's MOR after initial sintering. In still more preferred embodiments, the retained MOR should be at least 80% of the initial MOR. Depending upon the particular application, stresses, pressures, and temperatures of interest, after sufficient number of thermal cycles and stress changes, as the strength (and/or thermal shock resistance) of the components or apparatus degrades to reach a determine level of retained strength (and/or shock resistance), the component could then be evaluated for replacement. The components and apparatus of the subject invention, however, are anticipated to provide life duration for the relevant components and apparatus beyond the level that was previously available in the art.

In one aspect, this invention includes a regenerative thermal pyrolysis reactor apparatus or components for pyrolyzing a hydrocarbon feedstock (e.g., petroleum liquids, gas, or coal). The term hydrocarbon feedstock may be defined broadly to include virtually any hydrocarbonaceous feed and may also include substantially carbonaceous feeds such as graphite or coke. Exemplary hydrocarbon pyrolysis feedstocks that may have particular applicability for use in the present invention typically comprises one or more hydrocarbons such as methane, ethane, propane, butane, naphthas, gas oils, condensates, kerosene, heating oil, diesel, hydrocrackate, Fischer-Tropsch liquids, distillate, heavy gas oil, steam cracked gas oil and residues, crude oil, crude oil fractions, atmospheric pipestill bottoms, vacuum pipestill streams including bottoms, heavy non-virgin hydrocarbon streams from refineries, vacuum gas oils, low sulfur waxy residue, heavy waxes, coal, graphite, coke, tar, atmospheric residue, and heavy residue and hydrocarbon feeds. Undesirable solids and non-volatiles contained in the feedstreams may optionally be removed by one or more separation techniques, prior to feeding a volatizable fraction into the reactor.

This invention includes but is not limited to use of components, apparatus, reactors, and methods disclosed in various, previous patent applications, the entirety of each of which are included herein by reference, including (i) U.S. application Ser. No. 60/753,961, filed Dec. 23, 2005, titled "Controlled Combustion for Regenerative Reactors," (ii) U.S. application Ser. No. 11/639,691, filed Dec. 15, 2006, titled "Controlled Combustion for Regenerative Reactors;" (iii) U.S. application Ser. No. 11/643,541, filed Dec. 21, 2006, titled "Methane Conversion to Higher Hydrocarbons;" and (iv) U.S. patent application Ser. No. 12/119,762, filed May 13, 2008, titled "Pyrolysis Reactor Conversion of Hydrocarbon Feedstocks Into Higher Value Hydrocarbons." These patent applications teach and disclose various apparatus and methods for pyrolyzing hydrocarbon feeds in reverse flow regenerative pyrolysis reactors, including deferred combustion and controlled heat positioning processes. The inventions disclosed in this present invention may be suitable for use with but not limited to reactors as disclosed in these previous applications. In some embodiments, the inventive components and reactors may comprise reverse flow regenerative pyrolysis reactor systems, including but not limited such systems that may utilize deferred combustion in a reverse flow reactor to heat the reactor core. The term "pyrolysis" as used herein may be defined to include the use of thermal energy, whether produced directly, such as by furnace or indirectly such as by exothermic reaction, combustion, or heat transfer from a heated media, to cause the molecular conversion, reforming, degrading, gasification, or cracking of a hydrocarbon feedstock into a product stream, and may optionally include supplementation by one or more of catalysis, hydrogenation, diluents, and/or stripping agents.

In one embodiment, the invention includes a reactor apparatus and process providing that the requisite high heat may be achieved by creating a high-temperature region or "heat bubble" in a reactor core, such as via a two-step process wherein heat is (1) added to the bed via in-situ thermal reaction (e.g., combustion), and then (2) removed from the bed via in-situ endothermic pyrolysis reaction. The inventive components provide the strength, thermal shock resistance, and chemical stability required to enable commercialization of such apparatus and processes to operate at temperatures of at least 1500° C., and even in some embodiments in excess of 1600° C., in still other embodiments in excess of at least 1700° C., and in even other embodiments at temperatures in excess of 2000° C. The inventive components, apparatus, and process provides for a large-scale, cyclic, reverse-flow reactor system that is useful and operable on a commercially desirable scale and life cycle.

In some embodiments, reactor components may comprise one or more reactor monoliths, such as a novel design or function, or such as may be known in the art. An exemplary embodiment may include flow channels for conducting or transmitting at least one of a pyrolysis reactant, a pyrolysis feed, and a pyrolysis product through the monolith. The term "monolith" as used herein is defined broadly, including but not limited to an apparatus or conductive media typically having multiple substantially parallel flow channels through the apparatus for conducting a fluid, such as a gas, along such channels (e.g., a ceramic honeycomb such as commonly used for catalyst support, heat exchange, or in a catalytic converter).

The stabilized ceramic components and materials of the present invention comprise stabilized zirconia and are preferably stabilized by at least one stabilization component/material that includes at least one of CaO, MgO, $Y_2O_3$, $CeO_2$, and mixtures thereof. Preferably, the stabilized ceramic comprises at least one weight percent of the stabilization component, based upon the total weight of the stabilized zirconia. In other embodiments, the stabilized ceramic may further comprise (in addition to the above stabilizer) one or more oxides selected from the group consisting of Al, Si, Mg, Ca, Y Fe, Mn, Ni, Co, Cr, Ti, Hf, V, Nb, Ta, Mo, W, Sc, La, and Ce, and mixtures thereof. The oxides may be merely incidentally present, such as via contamination, or may be purposefully added such as to improve certain properties or uses, e.g., such as processability during manufacture; or may be generated and deposited as a bi-product from the thermal process and other materials present. In most embodiments, the stabilized zirconia may be considered a refractory grade zirconia. In many embodiments, at least some of the stabilized zirconia is a partially stabilized zirconia. Many embodiments will include use of a partially stabilized refractory grade zirconia. In some embodiments, the stabilized zirconia may include a mixture of both partially stabilized zirconia and fully stabilized zirconia. In still other embodiments, the stabilized zirconia may include a stabilized zirconia and separately a stabilizer, such as addition of at least one weight percent of stabilizer, such as mixture of stabilized zirconia and a neat stabilizer.

In one aspect, the invention includes a heat stable, formed ceramic component, the component comprising, a multimodal grain distribution including (i) at least 50 wt % of coarse grains including stabilized zirconia, the coarse grains comprising a D50 grain size in the range of from 5 to 800 μm, based upon the total weight of the component; and (ii) at least 1 wt % of fine grains comprising a D50 average grain size not greater than one-fourth the D50 grain size of the coarse grain, dispersed within the coarse grains, based upon total weight of the component; wherein after sintering, the component has porosity at ambient temperature in the range of from 5 to 45 vol. % based on the volume of the component. In another aspect, the fine grains include at least one of (i) a stabilized zirconia, (ii) a stabilizer, and (iii) mixtures thereof.

Grain size, also called particle size or grain size, refers to the diameter or geometric size of individual grains of the matrix comprising a multimodal grain distribution. The terms grain, grit, and particle may be used interchangeably. The term "multimodal" is defined herein as including at least two modes or groups of particle sizes within the component matrix, including bimodal, trimodal, and other mixed modes of particle sizes. Grains are distinct from crystallites and from the various crystals that constitute a particle or grain, although a grain may be comprised of a single crystal. A single grain can comprise one or several crystallites. A crystallite can comprise one or several crystals, a crystal being a solid-state matter that has uniform structure. A grain or particle is the individual ceramic or stabilizer granular material that forms the solid matrix for the ceramic component. The grains or particles are sintered and joined together at grain boundaries to create a formed ceramic component. Dynamic light scattering and laser light diffraction analysis using a unified scatter technique (Microtrac® 3500) can be used to determine average particle size and particle size distribution. Microtrac instruments can measure particle size ranging from 0.024 to 2800 μm and provide good instrument-to-instrument agreement, sample-to-sample agreement, instrument internal repeatability and particle distribution breadth.

The "D50" or average particle size measured by a laser light diffraction method is one type of average particle size represented as D50 or mean diameter. The D50 average particle size is a value determined by using a particle size distribution measuring device and represents a particle sample cut diameter which is the 50% volume or weight fraction value after determining the minimum and maximum sizes contributing to the integrated volume of a specific peak of a particle size distribution. Similarly D90, D10, D99 respectively corresponds to the 90, 10 and 99% volume or weight fractions of the particle size distribution. The average (D50) or any other particle size cut value can be determined by microscopy methods such as optical microscopy (OM), scanning electron microscopy (SEM) and transmission electron microscopy (TEM). The average particle size values measured by microscopy methods also can be converted to D50 values by methods known in the field.

The particle size distribution of the coarse grains alternatively can be determined by a sieve classification method. In this case mesh size can be used as a measurement of particle size and is obtained by sieving various sized particles through one or more screens (mesh). A mesh number indicates the number of openings in a screen per square inch. A mesh size of 100 would use a screen that has 10 wires per linear inch in both a horizontal and vertical orientation yielding 100 openings per square inch. A "+" before the mesh size (particle size) indicates that particles are retained on and are larger than the sieve. A "−" before the mesh size (particle size) indicates the particles pass through and are smaller than the sieve. For example, −170 mesh indicates the particles pass through and are smaller than the openings of a 170 mesh (88 μm) sieve. The volume or weight fraction of the particles that pass through the mesh is expressed as particle pass percent. In this method, the D50 average particle size is determined by a cut diameter for which the efficiency and the penetration is 50% or where half the volume or weight of size particles are captured and half penetrate the mesh. Sieve classification, however, tends to be more accurate with larger sized particles and may be difficult with small particles, such as less than 40 μm.

As a non-limiting example, a particle size distribution of coarse stabilized zirconia grains (H. C. Starck's Amperit® 827.054 Grade, 93/7 zirconia/yttria, agglomerated and sintered) used for producing a bi-modal ceramic composition of the instant invention is summarized in Table 2. The D50 average particle size of this exemplary coarse stabilized zirconia grains is 37 μm.

TABLE 2

| Particle Size | US Standard Sieve Size | Particle pass % |
| --- | --- | --- |
| −88.0 μm | −170 mesh | 100% less than |
| −63.0 μm | −230 mesh | 90% |
| −37.0 μm | −400 mesh | 50% |
| −20.0 μm | −635 mesh | 10% |

As another non-limiting example, a particle size distribution of fine stabilized zirconia grains (Tosoh TZ8Y Grade, 8 mol. % yttria stabilized zirconia) used for producing a bi-modal ceramic composition of the instant invention is summarized in Table 3. The D50 average particle size of this exemplary fine stabilized zirconia grains is 0.58 μm.

TABLE 3

| Particle Diameter | Frequency (%) |
| --- | --- |
| 4.0 μm | 0.0% |
| 3.0 μm | 2.6% |
| 2.0 μm | 6.9% |
| 1.0 μm | 21.9% |
| 0.9 μm | 5.6% |
| 0.8 μm | 2.5% |
| 0.7 μm | 4.2% |
| 0.6 μm | 4.7% |
| 0.5 μm | 6.7% |
| 0.4 μm | 7.7% |
| 0.3 μm | 11.4% |
| 0.2 μm | 11.6% |
| 0.1 μm | 12.9% |
| 0.01 μm | 1.3% |

The zirconia ceramic composition of the inventive composition comprises a multimodal (e.g., bimodal, trimodal, etc.) grain distribution suitably designed for close packing, and corresponding high density, optimized porosity, improved MOR flexural strength, and thermal shock resistance. The inventive multimodal composition includes a stabilized zirconia ceramic coarse grain mode, and often preferably a partially stabilized zirconia. In many embodiments, the fine grain mode is also comprised of stabilized zirconia, and often preferably a fully stabilized zirconia. In still other embodiments, the fine grain mode may be comprised of a partially stabilized zirconia, or, in many aspects the fine grain mode may be comprised merely of a stabilizer material, such as a metal oxide. Thus, the component matrix comprises a multimodal grain distribution comprising zirconia in at least the coarse mode. The coarse mode generally comprises the mode providing the largest mass percent of the component. (In an analogous view, the coarse mode might generally be recognized as the continuous phase of an emulsion.)

The multimodal grain distribution facilitates closely packing the component grains which provides density and commensurate MOR strength. However, simultaneously the multimodal distribution according to this invention provides matrix porosity within a determined range. The porosity feature of the matrix provides some microscopic flexibility among the particles while also permitting dissipation of stress concentrations (particularly with respect to arresting crack propagation), including thermal stress concentrations, and also provides high surface area for improved heat absorption and dissipation, as compared to typically less-porous high-density high-strength ceramics. The porosity feature is attributed with providing improved thermal stress crack resistance by inhibiting crack formation and arresting crack propagation, thereby providing enhanced service life in high temperature, cyclic thermal applications. The closely packed grain distribution is also maintained after sintering. E.g., after exposing the component to a sintering temperature of at least 1500° C. for at least ten minutes. In some embodiments, the microstructure of the stabilized refractory grade zirconia may also include a selected range or level of porosity (say for example, 5~45 vol % porosity, or 10~30 vol % porosity). Porosity is thus believed to provide the overall improved thermal stress performance and help impart superior physical and mechanical properties and thermal shock resistance desired in many cyclic pyrolysis applications.

More particularly, the advantageous properties and/or characteristics of the multimodal ceramics are based in part on the close packing of the ceramic grains, wherein one mode of bimodal grain distribution includes a D50 coarse grain particle size in the range of from 5 to 800 μm; and the other mode of grain distribution includes a D50 fine grain particle size in the range of not larger than one-fourth (¼) of the D50 grain size of the coarse grain. The fine grains are substantially evenly disbursed within the coarse grains. In one embodiment, for example, the fine grains may include a D50 size value that ranges from 0.01 to 100 μm. In other embodiments, for example, the fine mode grains may include a D50 size value that ranges from 0.05 to 44 μm, while in still other embodiments the fine mode grains include a D50 size value that ranges from 0.05 to 5 μm. For example, in one embodiment, the coarse grain mode includes a D50 size that ranges from 20 to 200 μm, while the corresponding fine grain mode may range from 0.05 to 5.0 μm. In still other embodiments, the small grain mode may include a D50 average size diameter that is not greater than one-eight the D50 size of the corresponding coarse grain mode. In some embodiments the D50 size of the fine mode grains may not exceed one tenth the D50 size of the coarse mode grains (e.g., not larger than one order of magnitude smaller than the coarse grain mode), while in other embodiments the D50 size of the fine grain mode will generally be less than about two orders of magnitude than the coarse grain mode (e.g., the fine grains are not larger than about 100 times smaller than the D50 diameter of the coarse grains).

The close packing of grains in a multimodal particle distribution facilitates enhanced sintering among the coarse grits as compared to sintering of only a monomodal coarse grain embodiment, and facilitates increased density with corresponding requisite porosity. The limitation on size of fine grits versus size of the coarse grits provides a range of formed ceramic component properties that may be preferred for use in components or reactors used at commercial scale size applications for performing high temperature thermal or pyrolysis processes. The porosity of the ceramic matrix of the formed ceramic component measured at ambient temperature, after sintering, is in the range of from 5 to 45 vol. %, based on the bulk volume of the formed component (e.g., based upon the volume of the ceramic matrix and interstitial or intragranular pore space of the formed ceramic component.) The relevant porosity refers to the free volume or pore space within the regions occupied by the ceramic matrix portions of the component and does not necessarily include the non-matrix occupying regions of the component such as the through-bores, channels, intricate offsets, etc. For example, in a ceramic tube, the porosity determination only pertains to the solid or circular-cross-sectioned portions of the tube and does not include the through-bore channel.

The porosity created in or among the closely packed grains is preferably substantially uniformly dispersed in the zirconia ceramic composition. This optimum porosity range is also at least in part responsible for improved thermal shock resistance of the zirconia ceramic composition, such as by arresting stress crack propagation and facilitating some elastic deformation of the matrix structure. Fine grits fit within the gaps between coarse grits and provide close packing and corresponding high packing density. Fine grits at the tangent between coarse grits may enhance adherent bonding after sintering the multimodal mix. The resulting adherent bonding between coarse grits is also at least partly responsible for high density and improved flexural strength of the ceramic composition.

The stabilized zirconia matrix comprising a multimodal grain distribution includes a specified porosity, preferably within a specified range, such as from 5 to 45 vol %. The zirconia ceramic composition of this instant invention can be characterized by porosity in the range of from 5 to 45 vol. %, or preferably in the range of from 10 to 40 vol. %, or more preferably in the range of from 10 to 30 vol. % based on the bulk volume of said the formed ceramic component. The pores comprising the porosity may or may not be interconnected but are preferably substantially uniformly distributed in the matrix as discrete pores. The porosity is measured at ambient temperatures after exposing said stabilized zirconia matrix to a typical sintering temperature of at least 1500° C. Some embodiments may be sintered from one to six hours, such as about two hours. Porosity describes the fraction of void space in the material and is defined by the fraction of the volume of void space over the total or bulk volume of material. Microscopy methods such as optical microscopy (OM) and scanning electron microscopy (SEM) in combination with image analysis software are used to determine porosity in this invention. Alternatively other methods can be employed to measure porosity, including water saturation method, mercury intrusion porosimetry, and nitrogen gas adsorption. Techniques for porosity determination of ceramic components are generally known in the art.

In one non-limiting exemplary form, a multimodal (e.g., bimodal) grain distribution of partially stabilized zirconia particles with a coarse grain size distribution of 21 to 65 μm and a fine grain size distribution of 0.05 to 2 μm and are utilized. In still yet another exemplary embodiment, a bimodal distribution of stabilized zirconia particles with a coarse grain size distribution of 30 to 120 μm and a fine grain size distribution of 0.1 to 5 μm are utilized. In still yet another exemplary form, a bimodal distribution of stabilized zirconia particles with a coarse grain size distribution of 40 to 200 μm and a fine grain size distribution of 0.1 to 10 μm are utilized. In still yet another exemplary form, a bimodal distribution of stabilized zirconia particles with a coarse grain size distribution of 100 to 500 μm and a fine grain size distribution of 1 to 20 μm are utilized.

For example, in various multimodal combinations for various embodiments, the D50 lower limit of the fine grain stabilized zirconia may be 0.01 or 0.05 or 0.5 or 1 or 5 μm in diameter. A practical D50 lower limit on the fine grain stabilized zirconia grains for many embodiments may be about 0.1 µm. Grains smaller than 0.1 m may tend to be of limited usefulness in many applications due to the fact that such small grains may not distribute evenly and tend to melt together and combine into sintered grains that are of about the same size as do grains that are at least 0.1 µm. The stabilized zirconia and stabilizer grains that are of at least about 0.1 m in diameter typically do not change size during or after sintering, whereas the nanoparticles may tend to combine into larger particles. For at least these reasons, the fine grain mode of many embodiments of the subject invention might not include nanoparticle D50 size grit, unless such mode is purposefully introduced into and mixed with the coarse and fine grain modes as a third or other mode. Commonly, nanoparticle modes of zirconia or stabilizer may generally only be considered as the fine grain mode of the multimode structure when such grains are of sufficient presence to combine with each other to provide a fine grain mode after sintering that provides mode grains of at least 0.1 µm after sintering. The D50 upper limit of the fine grain stabilized zirconia may be 100 or 44 or 20 or 15 or 10 or 5 or 1 µm in diameter. The D50 lower limit of the coarse grain stabilized zirconia may be 5 or 20 or 25 or 30 or 40 or 100 µm in diameter. The D50 upper limit of the coarse grain stabilized zirconia may be 800 or 500 or 200 or 100 or 50 µm in diameter.

In still yet another exemplary form, the D50 average particle size of the coarse grains may be about 30 µm and the D50 average particle size of the fine grains is about 0.3 µm. In another non-limiting exemplary form, the D50 average particle size of the coarse grains is about 50 µm and the D50 average particle size of the fine grains is about 0.5 µm. In yet another non-limiting exemplary form, the D50 average particle size of the coarse grains is about 100 µm and the average particle size of the fine grains is about 1.0 µm. In yet another non-limiting exemplary form, the D50 average particle size of the coarse grains is about 500 µm and the D50 average particle size of the fine grains is about 5.0 µm.

A non-limiting example of a multimodal (bimodal) grain distribution includes about 1 to 20 wt % of fine grain particles and about 80 to 99 wt % of coarse grain particles. Another suitable, non-limiting example of a bimodal grain distribution includes 85 to 99 wt % of coarse grains, such as with the average particle size of about 30 µm, and 1 to 15 wt % of fine grains, such as with a D50 average particle size of about 0.3 µm. Yet another suitable, non-limiting example of a bimodal grain distribution includes 94 to 99 wt % of coarse grains, such as with the average particle size of about 30 µm, and 1 to 6 wt % of fine grains, such as with a D50 average particle size of about 0.3 µm. Another non-limiting example of a bimodal grain distribution includes at least 94 to 97 wt % of coarse grains with the average particle size of about 30 µm, and 3 to 6 wt % fine grains with the average particle size of about 0.3 µm. Another non-limiting example of an exemplary bimodal grain distribution includes 88 wt % coarse grain with a D50 average particle size of 50 µm, and 12 wt % fine grain particles with a D50 average particle size of 0.5 µm. Still another non-limiting example of a bimodal grit includes 85 wt % of coarse grain with an average particle size of 100 µm, and 15 wt % of fine grain with an average particle size of 1.0 µm. The wt % of the fine grain size distribution may be, for example, from 1 to 20 wt % or 1 to 15% wt % or 2 to 12 % or 3 to 6% with the remaining grains constituting the coarse grit or other mode size distributions, such as intermediate distributions. Such exemplary multimodal zirconia particle mixes may provide an optimum density and porosity combination after sintering the stabilized zirconia matrix comprising the bimodal grain distribution, for various applications.

The particles in the stabilized zirconia matrix comprising the multimodal grain distribution can be substantially any shape. In many embodiments, a preferred shape may be those particle shapes that are substantially spherical or more spherical in dimensions than nonspherical. Some non-limiting acceptable examples include spherical, ellipsoidal, polyhedral, distorted spherical, distorted ellipsoidal, distorted polyhedral shaped, angular, rectangular, tetrahedral, quadrilateral, elongated, etc. The shape of fine grain particles may generally be of less importance than the shape of coarse grain particles. Spherical coarse grain is particularly beneficial providing close packing, density, optimum porosity, and flowability during powder processing and fabrication. A preferred spherical shape of the coarse grain can be characterized by an aspect ratio less of than 2.5, or preferably less than 2.0, or more preferably less than 1.5. Grains with generally smoother surfaces may also be preferred as compared to grains having highly irregular surface shapes.

Spherical shape refers to a symmetrical geometrical object where the set of all points in three dimensional space ($R^3$) which are at the distance R from a fixed point of that space, where R is a positive real number called the radius of the sphere. The aspect ratio of a shape is the ratio of its longest axis to its shortest axis. The aspect ratio of symmetrical objects may also be described by the ratio of two measures (e.g. length and diameter). The aspect ratio can be measured by microscopy methods such as optical microscopy (OM), scanning electron microscopy (SEM), and transmission electron microscopy (TEM), in combination with image analysis software, wherein a two-dimensional shape is projected. The ratio of the longer dimension to its shorter dimension is the aspect ratio.

The coarse grain in the stabilized zirconia matrix comprising a multimodal grain distribution can be either single crystalline or polycrystalline. Polycrystalline coarse grain is made of many smaller crystallites with varying orientation. Various types of coarse grain can be utilized which include but are not limited to agglomerated and sintered, fused and crushed, and spherodized. In one form, the coarse grain is agglomerated and sintered powder which is produced by spray drying of a suspension consisting of fine powders and organic binder and subsequent sintering. In another form, the coarse grain is fused and crushed, which is produced by fusing in arc furnaces and crushing of the cold block. In still another form of the disclosure, the coarse grain is spherodized, which is produced by atomization of agglomerates using a plasma flames to fabricate substantially spherical shaped particles.

The inventive multimodal, ceramic components include a substantially uniformly distributed porosity, preferably within the range of from about 5 vol % to about 45 vol %. A desired porosity value with that range may be defined and may be provided for during manufacture or preparation of the formed ceramic composition by controlling certain manufacturing or preparation properties, such as but not limited to grain size, mixing methods and energy, extrusion or pressing forces applied to the formed component, sintering temperature and time, etc. For example, preparation of the formed ceramic component prior to sintering may utilize a lower extrusion pressure or compaction pressure than is traditionally utilized in manufacture of engineering grade or even some refractory grade ceramics, whereby grain compaction is controlled to avoid over-compaction. The preparation properties and methods may be adjusted to yield a formed ceramic component or reactor that includes the desired porosity.

In addition to the above listed compounds or elements used to stabilize the zirconia grains (e.g., at least one mole percent of one or more of CaO, MgO, $Y_2O_3$, $CeO_2$ or mixtures thereof), the stabilized zirconia ceramic composition or formed components according to the present invention can further comprise oxides selected from the group of metals consisting of Al, Si, Mg, Ca, Y, Fe, Mn, Ni, Co, Cr, Ti, Hf, V, Nb, Ta, Mo, W, Sc, La, and Ce and mixtures thereof Non-limiting examples of such oxides may include but are not limited to $Al_2O_3$, $SiO_2$, MgO, CaO, $Y_2O_3$, $Fe_2O_3$, MnO, NiO, CoO, $Cr_2O_3$, $TiO_2$, $HfO_2$, $V_2O_5$, $Nb_2O_5$, $Ta_2O_5$, $MoO_3$, $WO_3$, $Sc_2O_3$, $La_2O_3$ and $CeO_2$. These metals and oxides may be present from one or more sources, such as in the form of an impurity, a selected additive, a component of the zirconia or another additive, and/or reprecipitated or otherwise derived during processing and sintering. The volume of oxides in the stabilized zirconia formed component may range from virtually none present up to 10 vol %, or in some embodiments from 0.01 to 5 vol %, or in still other embodiments from 0.1 to 3 vol % based on the volume of the stabilized zirconia, formed component.

The multimodal stabilized zirconia ceramic compositions, formed ceramic components, and reactors of the instant disclosure possess enhanced thermal and mechanical properties as compared to previously known ceramic components and reactors. The thermal shock resistance was determined by the rapid water quenching test as described in the earlier section of the disclosure. The normalized thermal shock resistance of the refractory grade stabilized zirconia of the instant disclosure is at least four and preferably at least five, on the herein disclosed normalized scale. The provided porosity range, the substantially uniform distribution of the porosity, and coarse grain grains help serve to arrest stress crack propagation and at least in part contribute to such performance properties.

The stabilized zirconia ceramic compositions, components, and reactors of the present invention possess flexural strength of at least 6 kpsi, or preferably at least 10 kpsi. In many embodiments, the inventive ceramic components may include a flexural strength of at least 6 kpsi with a corresponding normalized thermal shock resistance of at least four. The closely packed grains provided by the bimodal or other multimodal grain distribution as described in the earlier paragraphs at least partially contribute to imparting such attribute.

The superior thermal shock resistance, relative chemical inertness, improved flexural strength, and high temperature withstanding capability of the inventive zirconia ceramic compositions, components, and reactors of the present disclosure renders them relatively heat stable and structurally sound under cyclical thermal conditions at temperatures of 1500° C. and higher, such as up to 1700° C., 1800° C., or in some embodiments, up to 2000° C., particularly as compared to prior art refractory and thermal components and reactors. Such attributes and properties may provide for components and reactors that can replace conventional refractories, and also facilitate uses of components, reactors, and processes in relatively large scale commercial applications that were previously not achievable. In particular, the heat stable, formed ceramic components, reactors, and processes comprising the prescribed multimodal, stabilized zirconia matrix may find particular application in refining, petrochemical, chemical processing, and other high temperature thermal applications. A non-limiting, exemplary list of suitable uses includes key components of pyrolysis, reverse flow, regenerative, or other thermal reactors, including for example, thin-walled honeycomb monoliths, and complex-shaped mixers. It is believed that the improved combination of properties provided according to the present disclosure may facilitate commercial service periods of greater than 1 year, for example even up to about 10 years.

In one form, the multimodal stabilized zirconia ceramic composition disclosed herein may be prepared or made by application of conventional ceramic powder processing technique such as mixing, milling, pressing or extruding, sintering and cooling, employing as starting materials a suitable ceramic powder and a binder powder in the required volume ratio. Certain of the process steps may be controlled or adjusted, as discussed previously herein, to facilitate manufacture of the desired porosity range and performance properties. For example, the two or more modes of powders, oxides, and/or stabilizers may be milled in a ball mill in the presence of an organic liquid such as ethanol or heptane for a time sufficient to substantially disperse the powders in each other. Excessive binder powder and liquids may be removed and the milled powder dried, placed in a die or form, and pressed, extruded, formed, caste or otherwise formed into a desired shape, such as may be referred to as a "green body." The resulting green body is then sintered at temperatures of at least 1500° C. and commonly up to about 1800° C., such as for at least ten minutes, and often for times typically ranging from about 10 minutes to about two hours and in some applications even up to 4 hours. The sintering operation may be performed in an oxidizing atmosphere, an inert atmosphere, or under vacuum. For example, the oxidizing atmosphere can be air or oxygen, the inert atmosphere can be argon, and a reducing atmosphere can be hydrogen. The sintering atmosphere, temperature, and kiln environment may also introduce oxides (as discussed previously herein) into the component, either desirably or undesirably, as a contaminant or desired/permitted constituent of the ceramic component. Thereafter, the sintered body is allowed to cool, typically to ambient conditions. The cooling rate may also be controlled to provide a desired set of performance properties in the particular component. For example, slower cooling may provide for growth of larger ceramic crystals or grain-bodies and quicker cooling may provide for more granular type texture.

In other aspects, the invention includes a thermal pyrolysis reactor for pyrolyzing a feedstock, such as but not limited to a hydrocarbon, such as but not limited to an alkane, an alkene, an aromatic, and/or coal, the reactor comprising: a multimodal ceramic component including at least a fine grain mode and a coarse grain mode, the coarse grain mode comprising stabilized zirconia and the fine grain mode comprising at least one of a stabilized zirconia and a stabilizer, such as but not limited to a metal oxide stabilizer, such as but not limited to an yttria oxide stabilizer, wherein after sintering, the component includes (i) porosity at ambient temperature in the range of 5 to 45 vol %, based on the volume of the component. Preferably, the multimodal component also comprises a flexural strength of at least 6 kpsi and a normalized thermal shock resistance rating of at least four. In many preferred embodiments, the reactor includes a multimodal component comprising (i) at least 50 wt % of the coarse grains including stabilized zirconia, the coarse grains including a D50 grain size in the size range of from 5 to 800 μm, based upon the total weight of the component; and (ii) at least 1 wt % of a fine grains including stabilized zirconia, the fine grains including a D50 grain size in the range of 0.01 to 100 μm, or preferably 0.01 to 44 μm, dispersed within the coarse grain mode, based upon the total weight of the component.

In other embodiments, the invention includes a process for the manufacture of a hydrocarbon pyrolysis product from a hydrocarbon feed using a regenerative pyrolysis reactor, the process comprising the steps of: (a) providing a pyrolysis reactor with a reactive region that comprises a multimodal stabilized ceramic component, wherein the ceramic component has porosity at ambient temperature in the range of from 5 to 45 vol. %, based on the volume of the component, and comprises a flexural strength of at least 6 kpsi, and a normalized thermal shock resistance rating of at least four; (b) heating the reactive region to a temperature of at least 1500° C. to create a heated reactive region; (c) feeding a hydrocarbon feed to the heated pyrolysis reactor to pyrolyze the hydrocarbon feed and create a pyrolyzed hydrocarbon feed; and (d) quenching the pyrolyzed hydrocarbon feed to produce the hydrocarbon pyrolysis product.

In yet other embodiments, the invention includes a process for preparing a thermal reactor comprising the steps of: (a) preparing a ceramic component comprising bimodal, stabilized zirconia; and (b) sintering the ceramic component at a temperature of at least 1500° C.; (c) providing the sintered ceramic component in a reactive region of a thermal reactor; wherein after the sintering, the ceramic component reactive region component comprises a bulk porosity measured at ambient temperature in the range of from 5 to 45 vol. %, based on the bulk volume of the component, and preferably including a flexural strength of at least 6 kpsi and preferably including a normalized thermal shock resistance rating of at least four.

In one exemplary reactor embodiment, segregated reactant flow channels may be provided to facilitate deferred combustion. The flow channels may comprise ceramic components according to the present invention, such as by relatively thin-walled, honeycomb monolith type structures. The term "honeycomb monoliths" is defined broadly and generally, to include but not be limited to extruded, ceramic structures as are generally known in the reaction industry, such as in catalytic converters, etc., capable of conveying a fluid through the framework of channels. The term "honeycomb" is also used broadly herein to refer to any framework of channels, regardless of cross-sectional geometry, that includes multiple substantially parallel flow paths or channels and is not intended to limit the structure or shape to any particular geometric shape. The channels each may have practically any cross-sectional shape, although a generally symmetrical cross-sectional shape may be preferred. Each monolith may include a single channel, a few channels, or multiple channels, e.g., tens, hundreds, or even thousands of channels, depending upon the size of the particular monoliths and reactors utilized therein. For example, in one embodiment, the conduits may have a diameter of only a few millimeters, and preferably on the order of about one millimeter. A reactor may comprise a single, multiple, or even numerous monoliths. The monoliths may be further arranged into cells or groups of monoliths, wherein each of a group of cells is dedicated to conducting one of the two simultaneously conveyed materials, while another group of cells conveys the other material. A preferred monolith arrangement will provide low pressure loss or drop during reactant or product transference, while providing necessary product contact time and heat transfer during conductance. The arrangement preferably also provides adequate mixing of the conveyed materials after exiting the monoliths, such as in or near the reaction zone. In addition to providing a flow conduit, the channels also facilitate effective material isolation barriers (e.g., function such as conduit walls) to prevent cross flow or mixing between the first and second reactants and maintain a majority of the reactants effectively separated from each other until mixing is permitted. Such reactor might be useful, for example, in pyrolyzing methane to acetylene at temperatures of at least 1500° C. Such acetylene can then readily be converted to olefin products, such as ethylene or propylene.

In some embodiments, for example, the inventive components and/or reactors may provide a conduit packing arrangement with an average wetted surface area per unit volume that ranges from about 50 $ft^{-1}$ to about 3000 $ft^{-1}$, more preferably from about 100 $ft^{-1}$ to 2500 $ft^{-1}$, and still more preferably from about 200 $ft^{-1}$ to 2000 $ft^{-1}$, based upon the volume of the first reactor used to convey a reactant. For a packed bed of spherical packing particles, the relevant surface are would be determined simply by the sphere diameters. For a reactor bed comprising honeycomb monolith structures, the relevant wetted area dimension is simply the wall thickness separating the flow channels. Preferred wall thickness of some honeycomb monoliths according to the present invention is less than 2.5 mm, more preferably less than 1.0 mm, down to a probable minimum wall thickness of not less than around 0.1 mm. These relatively thin walls are enabled by the strength, thermal shock resistance properties, and relative chemical activity inertness of the inventive components. The durable, heat resistant stabilized zirconia of the present invention may be ideal at enabling use of relatively thin but strong reactor flow channel walls. The relatively high density of the components also helps mitigate excessive reactant cross-flow through the conduit or pore walls. The relatively high surface area per unit volume values facilitated by the high number of relatively small reactant pores or conduits are likely preferred for many embodiments to aid achieving a relatively quick change in temperature gradient through a reactor. In some applications, quick temperature change is preferred to permit relatively quick and consistent quenching of the reaction to prevent creating coke. The relatively high thermal stability, thermal shock resistance, and heat transfer capability of the inventive materials enable quick temperature changes without excessive material failure or degradation due to thermal shock or stress.

For example, in some embodiments, a reactor may be provided with flow channels and other high temperature-exposed components and packing according to the present invention that includes a high volumetric heat transfer coefficient (e.g., greater than or equal to 0.02 $cal/cm^3$ s° C., preferably greater than about 0.05 $cal/cm^3$ s° C., and most preferably greater than 0.10 $cal/cm^3$ s° C.,), with corresponding low resistance to flow (low pressure drop), have operating temperature range consistent with the highest temperatures encountered during regeneration, have high resistance to thermal shock, and have high bulk heat capacity (e.g., at least about 0.10 $cal/cm^3$ ° C., and preferably greater than about 0.20 $cal/cm^3$ ° C.). As with the high surface area values, these relatively high volumetric heat transfer coefficient values, high strength (MOR), and chemical reactivity inertness properties may be suitable for use in various reactor embodiments to aid in achieving a relatively quick change in the temperature gradient through the reactor. These cited values are merely projected averages based upon the prospective volume of a typical, exemplary reactor such as may be used for conveyance of a reactant in a process.

Other applications, for example, may use ceramic and reactor components other than those previously described but still according to the present invention, such as whereby the channel conduits/flow paths are substantially linear and tubular. Other alternative embodiments may include more tortuous pathways (e.g. convoluted, complex, winding and/or twisted but not linear or tubular) through a component, than the previously described monoliths, including but not limited to labyrinthine, variegated flow paths, conduits, tubes, slots, and/or a pore structure having channels through a portion(s) of the reactor.

Some exemplary conditions may include a residence time from 0.001 to 1.0 seconds and may typically include, for example, a pressure from about 5 to 50 psia (34 to 345 kPa).

In some embodiments, the reactor conditions may be at a vacuum pressure, such as less than 15 psia (103 kPa). For purposes of this discussion, the term "residency time" refers to the time exposed to temperatures typically in excess of about 1200° C. For example, in many useful reactors, the residency time at such temperature, and more preferably at temperatures in excess of 1200° C., is preferably less than about 0.005 seconds, such as within a range of from 0.001 to 0.010 seconds, or within a range of from 0.001 to about 0.005 seconds. However, the total time in the reactor bed system could be longer, such as on order of 0.030 seconds or greater, depending upon the quenching process and reactor channel length. The regenerative pyrolysis reactor system may heat the hydrocarbon feedstock to temperatures in excess of 1500° C., possibly in excess of 1600° C., in other processes in excess of 1700° C. In some reactions, it may even be preferable to heat the feeds for very short time duration, such as less than 0.1 seconds, to a temperature in excess of 1800° C. or even in some instances in excess of 2000° C. An exemplary preferred process may pyrolyze the feed stream within the reactor, such as at temperatures of from about 1500° C. to about 1900° C., and more preferably from about 1600° C. to about 1700° C. Exemplary residency times preferably may be short, such as less than 0.1 seconds and preferably less than about 5 milliseconds. Some hydrocarbon conversion processes may be performed in the presence of hydrogen, hydride, other hydrocarbons, and/or other diluents or stripping agents.

In one exemplary process, the pyrolysis conversion of methane to acetylene, the reactor channels may comprise the inventive ceramic components and provide the necessary heat transfer capacity to create the desired sharp temperature gradients through the reactor, at the space velocity conditions of operation. Adequate heat transfer rate is characterized by a heat transfer parameter $\Delta T_{HT}$, below about 500° C., more preferably below about 100° C., and most preferably below about 50° C. The parameter $\Delta T_{HT}$, as used herein, may be defined as the ratio of the bed-average volumetric heat transfer rate that is needed for recuperation, to the volumetric heat transfer coefficient of the bed, $h_v$. The volumetric heat transfer rate (e.g. cal/cm$^3$ sec) that is sufficient for recuperation is calculated as the product of the gas flow rate (e.g. gm/sec) with the gas heat capacity (e.g. ca./gm ° C.) and desired end-to-end temperature change (excluding any reaction, e.g. ° C.), and then this quantity divided by the volume (e.g. cm$^3$) of the recuperator zone traversed by the gas. The $\Delta T_{HT}$ in channel is computed using gas, channel with gas, and total recuperator zone with total gas. The volumetric heat transfer coefficient of the bed, $h_v$, is typically calculated as the product of a area-based coefficient (e.g. cal/cm$^2$ s° C.) and a specific surface area for heat transfer ($a_v$, e.g. cm$^2$/cm$^3$), often referred to as the wetted area of the packing.

ILLUSTRATIVE EXAMPLE 1

Close Packing of Bimodal Grains

Table 4 depicts an exemplary multimodal grain distribution including a coarse grain mode of partially stabilized zirconia and a fine grain mode of more-stabilized zirconia, used for producing a stabilized zirconia matrix comprising a bimodal grain distribution. The coarse grit (H. C. Starck's Amperit® 827.054) is an agglomerated and sintered powder which is produced by spray drying of a suspension consisting of fine powders and organic binder and subsequent sintering. The fine grit (Tosoh TZ8Y) is produced by a hydrolysis process, which ensures uniform dispersion of yttria in zirconia and fine particle size.

TABLE 4

| Company | Grade | Chemistry (wt %) | Size |
|---|---|---|---|
| H. C. Starck | Amperit® 827.054 | ZrO$_2$: Balance, Y$_2$O$_3$: 7.0~9.0%, HfO$_2$: 2.0%, Al$_2$O$_3$: 0.2%, Fe$_2$O$_3$: 0.3%, SiO$_2$: 0.5%, TiO$_2$: 0.4% | 21~65 μm (Spherical Particle) |
| Tosoh | TZ8Y | ZrO$_2$: Balance, Y$_2$O$_3$: 13.3%, Al$_2$O$_3$: 0.1%, Fe$_2$O$_3$: 0.01%, SiO$_2$: 0.02%, Na$_2$O: 0.12% | 0.05~2.0 μm (Crystallite Size) |

In the above example, 97 vol % of coarse grit of stabilized zirconia powder and 3 vol % of fine grit of stabilized zirconia powder were mixed with an organic binder for use in an extrusion process. The bimodal powder mixture was extruded to fabricate a green body in the size of about 1.13 mm thickness, 7.9 mm width and 100 mm length. The extruded green body was dried and fired (sintered) at 1500° C. for 2 hrs in an industrial kiln to fabricate a sintered body.

Referring to FIG. 1, FIG. 1a illustrates a Scanning Electron Microscopy (SEM) image of the sintered, formed ceramic component (1500° C., 2 hrs) processed according to this invention, wherein the legend bar represents 50 μm. Spherical coarse grains are in the D50 average grain size of about 30 μm and fine grains are in the D50 average grain size of about 0.3 μm. The fine grains are preferentially located at the neck between coarse grains and provide enhanced bonding between coarse grains. In this image, porosity appears dark and located at interspaces created between grains. The resultant sintered, formed ceramic component comprised:
  i) 70% stabilized zirconia matrix comprising a bimodal grain distribution including 97 vol. % coarse stabilized zirconia with average grain size of about 30 μm; and 3 vol. % fine stabilized zirconia with average grain size of about 0.3 μm.
  ii) 30 vol % porosity.
  iii) Normalized thermal shock resistance rating is 5
  iv) MOR Flexural Strength is 6.0 kpsi To determine the thermal stability of the zirconia ceramic composition of this invention, the sintered body (1500° C., 2 hrs) was further processed (e.g., annealed) at experimentally simulated commercial conditions, to a temperature of 1800° C. for 100 hrs in hydrogen flowing at a rate of 50 cc/min. A commercial, high temperature, high vacuum furnace facility was used to conduct this experiment. 100 hrs total annealing exposure at 1800° C. was segmented in 5 cycles of 20 hrs each. In each cycle, the sample body or component was heated to 1800° C. at a heating rate of 15° C./min, held at 1800° C. for 20 hrs and cooled to 50° C. (ambient) at a cooling rate of 15° C./min. Five cycles were employed to simulate rapid start up and shut down processes and to investigate the effect of thermal shock. FIG. 1b of FIG. 1 provides an SEM image of the "annealed" body after heating at 1800° C. for 100 total hours in flowing hydrogen, wherein the legend bar represents 50 μm. The image discloses spherical coarse grits that are still in the D50 average grain size of about 30 μm, but the fine grits have combined and become substantially larger and provide enhanced bonding between coarse grits. Porosity appears dark and uniformly distributed in the annealed body. The measured porosity of the annealed body is about 17 vol %. The normalized thermal shock resistance rating is 5 and the MOR Flexural strength is measured at 6.8 kpsi. Thus, as with the properties of the sintered component embodiment, the further annealed component demonstrates grain size and porosity that also provide the desirable, superior mechanical strength and thermal shock resistance. The ability of the selected coarse grit mode to maintain its grain size while exposed to annealing, as compare to the grit size after sintering may help provide and explain, at least in part, why the thermal shock resistance remains high after sintering and even after annealing. At least part of this property may be due to the selected D50 size range for the coarse grit mode. (e.g., 5 μm to 800 μm). The measured properties of the further annealed embodiment comprised:

i) 75% stabilized zirconia matrix
ii) 25 vol % porosity.
iii) Normalized thermal shock resistance rating is 5
iv) MOR Flexural Strength is 6.8 kpsi Note that the MOR actually increased from about 6.0 after sintering to about 6.8 after such annealing, thus demonstrating a net gain in such strength. The SEM photographs clearly demonstrate the change in appearance between sintering and annealing. It is recognized however, that over significantly more extended periods of annealing or use, such as over several months of use in a commercial reactor, that such strength may begin to decrease and may actually do so to a point that it becomes desirable to replace the component. However, it is anticipated that such occurrence may not happen for many months or even years.

COMPARATIVE EXAMPLE 2

Monomodal Grits

To illustrate the beneficial effect of the multimodal grit distribution of this instant invention, a comparative sample was prepared using a monomodal grit distribution. A stabilized zirconia (coarse grit) was obtained from Alfa Aesar (Stock No. 36272; Chemistry $ZrO_2$: Balance, $Y_2O_3$: 10.0~15.0%, $HfO_2$: 2.0~4.0%; D50 Particle size:-325 mesh, i.e. D50 size of about 44 μm) and mixed with organic binder needed for extrusion process. The mixed powder was extruded to fabricate a green body of 0.36 mm thickness, 2.6 mm width, and 50 mm length. The extruded green body was dried and fired at 1500° C. for 2 hrs in an industrial kiln to fabricate a sintered body.

Figure 2:
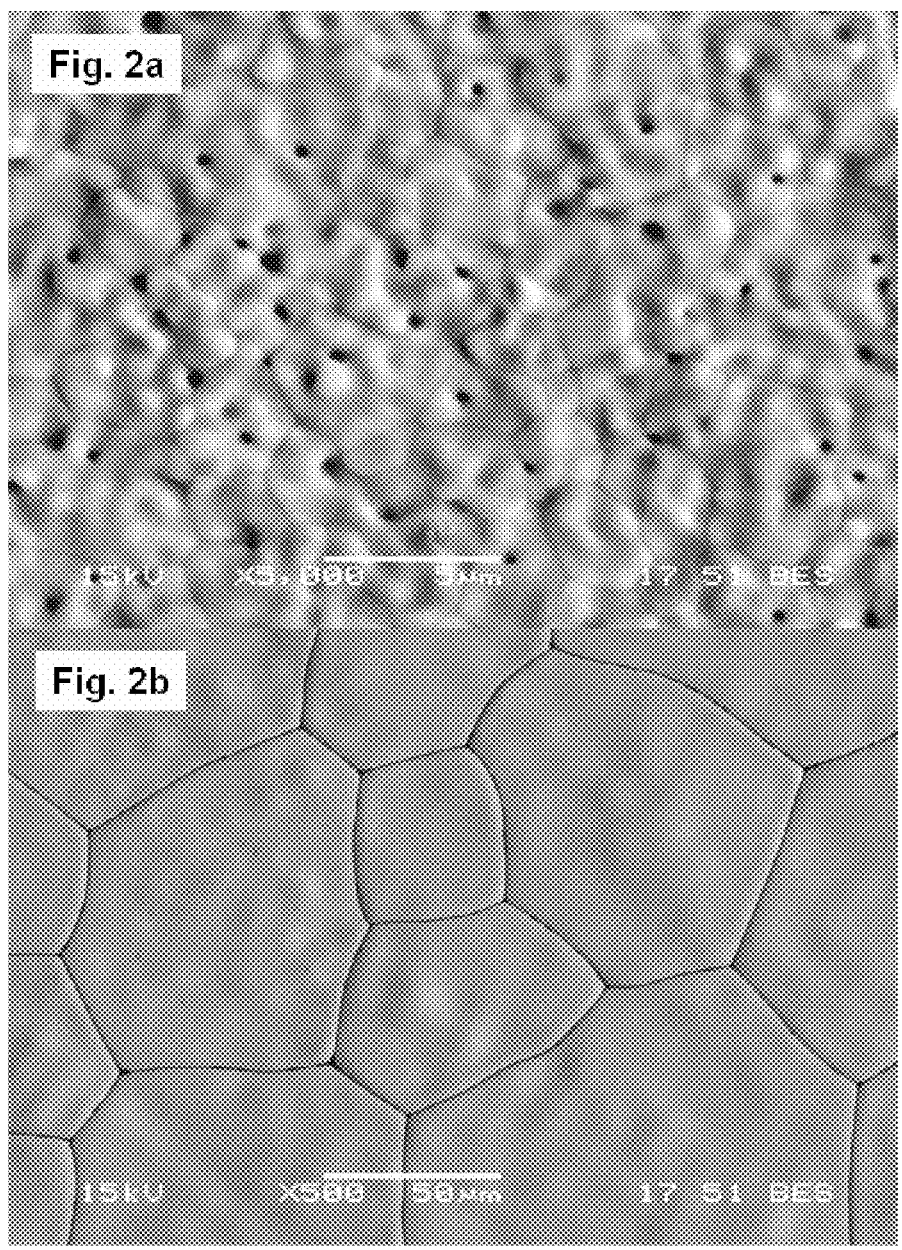
FIG. 2 illustrates an SEM photograph of a sintered (FIG. 2a) and annealed (FIG. 2b) comparative, monomodal ceramic component not according to the present invention.

Referring to FIG. 2, FIG. 2a demonstrates an SEM image of the resulting sintered body (1500° C., 2 hrs) processed according to this example, wherein the legend bar represents 5 μm. In this image, all grits are in the D50 average grain size of about 3.0 μm and porosity appears dark. The resultant sintered body comprised:

i) 96% stabilized zirconia ceramics comprising a monomodal grain distribution in average grain size of about 3 μm
ii) 4 vol. % porosity
iii) Normalized thermal shock resistance=1
iv) MOR flexural strength=40.0 kpsi To determine the thermal stability of the stabilized zirconia ceramics having monomodal grit distribution, the sintered body (1500° C., 2 hrs) was further annealed at 1700° C. for 100 hrs in air. A conventional high temperature box furnace was used for this experiment. FIG. 2b discloses an SEM image of the component body after reheating at 1700° C. for total 100 hrs in air, in a single stage or cycle, wherein the legend bar represents 50 μm. The sample was not annealed in five, 20 hr stages as in Example 1 because the resulting sample of Example 2 after sintering was a highly dense ceramic and such material is known to have very low thermal shock resistance and would have been highly fractured and possibly even destructed beyond measurement usefulness if exposed to such cyclic annealing. The image in FIG. 2b discloses monomodal grits that were originally about D50 size of 3.0 μm in size that have significantly grown to D50 size of about 50 μm and very little to no porosity is observed. The substantially densified, stabilized zirconia ceramic demonstrates excessive grain growth and provides high mechanical strength, but are low thermal shock resistance, rendering this material unusable in cyclic high temperature pyrolysis reactors. The measured properties of the annealed embodiment comprised:

i) 99.99% stabilized zirconia matrix
ii) 0.01 vol % porosity
iii) Normalized thermal shock resistance rating is 1
iv) MOR Flexural Strength is 45.0 kpsi

ILLUSTRATIVE EXAMPLE 3

Close Packing with Multimodal Grain Distribution

The same coarse and fine grit materials of illustrative Example 1, that is, 90 vol % coarse grit of stabilized zirconia powder and 10 vol % of fine grit of stabilized zirconia powder, were mixed with organic binder for extrusion processing. The bimodal powder mixture was extruded to fabricate a green body in the size of about 0.55 mm thickness, 7.6 mm width, and 50 mm length. The extruded green body was dried and fired at 1500° C. for 2 hrs in an industrial kiln to fabricate a sintered body.

Figure 3:
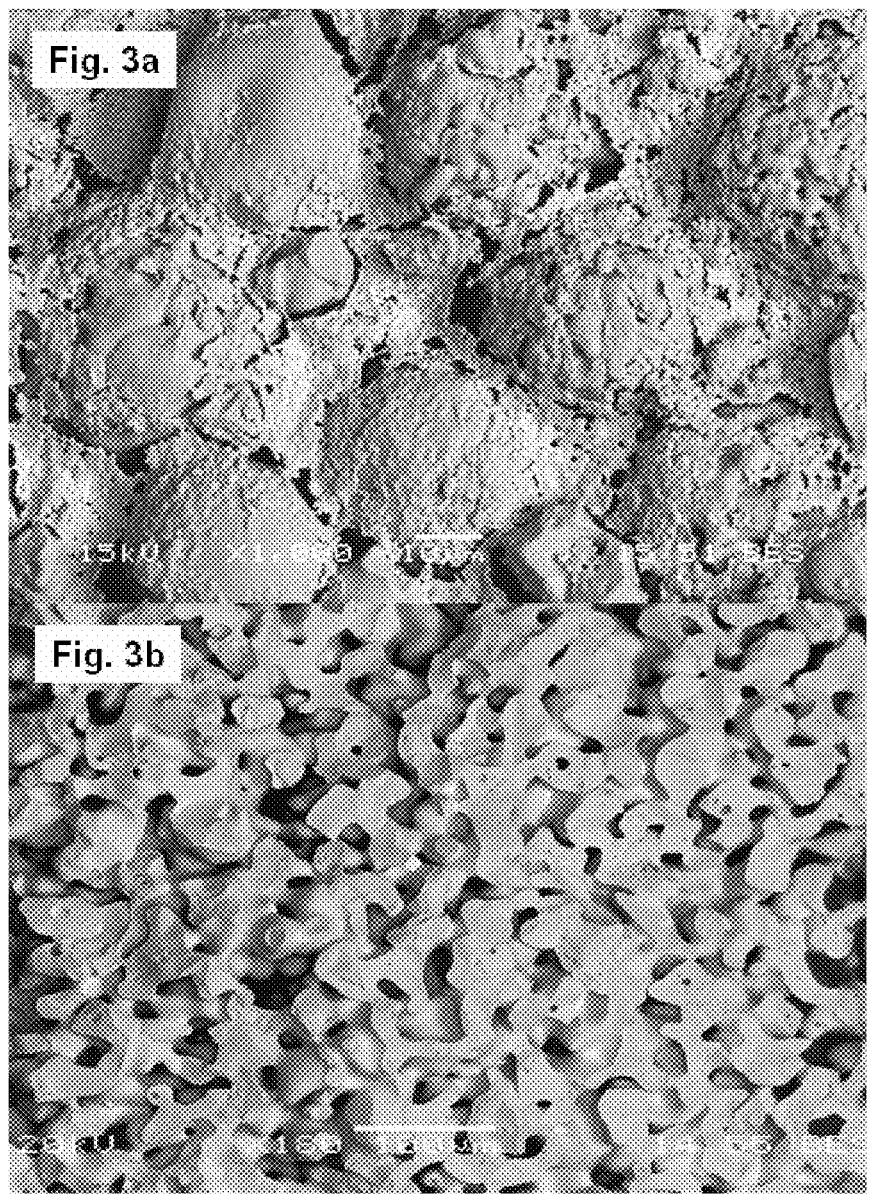
FIG. 3 illustrates an SEM photograph of a sintered (FIG. 3a) and annealed (FIG. 3b) exemplary, multimodal ceramic component according to the present invention.

FIG. 3a of FIG. 3 illustrates an SEM image of the resulting sintered component (1500° C., 2 hrs) processed according to this example, wherein the legend bar represents 10 μm. In this image, substantially spherical coarse grits are in the D50 average grain size of about 30 μm and the D50 fine grits are in the average grain size of about 0.3 μm. The fine grits are beneficially distributed throughout the various pores or necks between coarse grits and provide enhanced bonding between coarse grits while maintaining the desired porosity and corresponding desirable mechanical properties. In this image, porosity appears dark and located at interspaces created between coarse grits. The resultant sintered body comprised:

i) 75 vol % stabilized zirconia matrix comprising a bimodal grain distribution including 90 vol. % coarse stabilized zirconia with average grain size of about 30 μm; and 10 vol. % fine stabilized zirconia with average grain size of about 0.3 μm.
ii) 25 vol % porosity
iii) Normalized thermal shock resistance=5
iv) MOR flexural strength=6.3 kpsi To understand the thermal stability of the exemplary zirconia component, the sintered body (1500° C., 2 hrs) was further annealed at 1800° C. for 100 hrs in flowing hydrogen at a rate of 50 cc/min. A high temperature, high vacuum industrial furnace was used for this experiment. Exposure time of 100 hrs at 1800° C. was segmented in 5 cycles of 20 hrs, as in Example 1. In each cycle, the sintered body was heated to 1800° C. at a heating rate of 15° C./min, held at 1800° C. for 20 hrs, and cooled to 50° C. at a cooling rate of 15° C./min. Five such cycles were employed to simulate rapid start up and shut down processes and to investigate the effect of thermal shock in the annealed ceramic body.

FIG. 3b illustrates an SEM image of the fracture cross section of the component body of FIG. 3a after annealing at 1800° C. for total 100 hrs in flowing hydrogen, wherein the legend bar represents 100 μm. In this image, spherical coarse grits are still in the average grain size of about 30 μm, but fine grits have become substantially larger, providing enhanced bonding near the convergence points where the large grains touch and are bonded to adjacent coarse mode grains. The resulting location of the fine grains after sintering and even after annealing, serves to preserve porosity in the significant void areas that are remote to the points of adjacent contact between the coarse grits. Such resulting matrix construction may thus facilitate optimization of enhanced flexural strength combined with enhanced thermal shock resistance. The measured properties of the annealed embodiment comprised:
  i) 85% stabilized zirconia matrix
  ii) 15 vol % porosity.
  iii) Normalized thermal shock resistance rating is 5
  iv) MOR Flexural Strength is 7.2 kpsi The optimum grain size and porosity in the annealed body provide superior mechanical strength and thermal shock resistance. Although not shown herein, further extended experimentation durations have demonstrated still further increases in MOR strength with additional annealing time, while also maintaining desired porosity.

Further, it is believed that maintaining the proper selection of grain size ratios between the grit modes may at least in part facilitate maintaining these properties at high temperature. For example, selection of a fine mode grit D50 size within a range of not greater than one-fourth the D50 size of the coarse grain mode may in some embodiments facilitate dispersing the fine grain mode grains such that when sintered they are predominantly sintered at or near the points of tangency with respect to the adjacent coarse grains. It may also be preferable in some embodiments that the fine grain mode has a D50 average size that is not greater than one-eight the D50 size of the coarse grain mode. In other embodiments the D50 size of the fine grain mode may not be larger than one-tenth or one order of magnitude of the D50 size of the coarse grain mode. In still other embodiments, the D50 size of the fine grain mode may not be larger than two orders of magnitude (e.g. 0.01) smaller than the D50 size of the coarse grain mode. For similar reasons, it may be preferable that the shape of at least the coarse grain mode particles, and in some embodiments also the fine grain mode particles (although typically less preferable than with the coarse grain mode) be as spherical or substantially spherical as possible. In many embodiments, it may be preferable that at least a majority by weight of the coarse grain mode grains demonstrate a shape factor of not greater than 2.0 (e.g., the ratio of the length of the longest 3-d axis of a grain to the length of shortest 3-d axis of such grain). In still other embodiments, it may be preferable that at least a majority by weight of the fine mode grains also have a shape factor of not greater than 2.0, although the shape of the fine grain is typically of lower significance.

In other embodiments, the present invention includes a process for the manufacture of a hydrocarbon pyrolysis product from a hydrocarbon feed using a regenerative pyrolysis reactor system, comprising the steps of: (a) providing a pyrolysis reactor with a reactive region that comprises a multimodal stabilized zirconia ceramic component, wherein the ceramic component has porosity at ambient temperature in the range of from 5 to 45 vol. % based on the volume of the component, comprises a flexural strength of at least 6 kpsi, and includes a normalized thermal shock resistance rating of at least four; (b) heating the pyrolysis reactor reactive region to a temperature of at least 1500° C. to create a heated reactive region; (c) feeding a hydrocarbon feed to the heated reactive region to pyrolyze the hydrocarbon feed and create a pyrolyzed hydrocarbon feed; and (d) quenching the pyrolyzed hydrocarbon feed to produce the hydrocarbon pyrolysis product. The process may optionally include the step of heating the reactor by in-situ thermal reaction, such as but not limited to deferred combustion, burning, exothermic reaction, and direct feed combustion processes, such processes being generally known in the pyrolysis art. The produced pyrolysis reactor product may be quenched in another reactor region that comprises the inventive multimodal stabilized zirconia ceramic component and/or another quench media.

In another aspect, the invention includes a process for preparing a thermal reactor comprising the steps of: providing a sintered multimodal ceramic component in a reactive region of a thermal reactor, the multimodal ceramic component comprises; (i) at least 50 wt % of the coarse grains including stabilized zirconia, the coarse grains including a D50 grain size in the size range of from 5 to 800 µm, based upon the total weight of the component; and (ii) at least 1 wt % of a fine grains including stabilized zirconia, the fine grains including a D50 grain size in the range of 0.01 to 100 µm dispersed within the coarse grain mode, based upon the total weight of the component, the ceramic component comprises a porosity at ambient temperature in the range of from 5 to 45 vol. %, based on the volume of the component, a flexural strength of at least 6 kpsi, and a normalized thermal shock resistance rating of at least four. The process may also include the step of providing the sintered ceramic component in a quenching region of the pyrolysis reactor. Also, the inventive process may comprise the step of further thermally processing the ceramic component (either during component fabrication or during actual commercial use) by heating the ceramic component to a temperature of at least 1500° C. for at least two hours, either cyclically or in one stage, such as in air, a reactive environment, inert environment, or mixtures thereof.

The invention further includes a process for forming a ceramic component, such as but not limited to a pyrolysis reactor component, the process comprising: (a) preparing a mixture comprising a multimodal grain distribution including; (i) at least 50 wt % of coarse grain mode including stabilized zirconia, the coarse grain mode comprising a D50 grain size in the range of from 5 to 800 µm, based upon the total weight of the component; and (ii) at least 1 wt % of fine grain mode comprise at least one of a stabilized zirconia and a stabilizer, the fine grain mode comprising a D50 average grain size not greater than one-fourth the D50 grain size of the coarse grain mode, dispersed within the coarse grains, based upon the weight of the mixture; (b) forming the mixture into a shape; (c) sintering the shape; wherein after sintering, the component has porosity at ambient temperature in the range of from 5 to 45 vol. %, based upon the formed volume of the component. The prepared mixture of step (a) may be poured, rolled, pressed, or extruded, etc., into the desired shape or form using a shaping force. However, care and manufacturing consideration may need be taken in controlling and limiting (such as by monitoring and selectively applying) the shaping force, such as by using less force than may have been applied to form such component using prior art ceramics and techniques, such that the resulting porosity after sintering is at least fiver vol %, and more preferably at least 10 vol %, while also the porosity does not exceed a maximum range, such as 45 vol %, or more preferably not greater than 30 vol %. Preferably the porosity is at least within the range of from 5 to 45 vol %, or more preferably within a range of 10 to 30 vol %, or in some instances even more preferably within a range of 10 to 25 vol %, based upon the volume of the ceramic component. "Controlling" the force means to limit the amount of force applied so as to avoid excessive compaction or crushing of the multimodal grains, such that the resulting porosity is lower than the desired lower limit, e.g., 5 vol %. Similarly, "controlling" also means to avoid using too little or too low of a force such that the resulting porosity becomes undesirably vugular or exceeds the desired maximum porosity limit, e.g., 45 vol %, for the particular component being formed. The amount of force applied is outcome determinative and may depend upon factors such as the mixture composition (multimodal contents) of the formed component, desired resulting porosity, intended use, etc. The process may further include the step of monitoring (either directly, indirectly, or by inference, including but not limited to observation, electronic, optical, analytical, physical, or any other means for monitoring) the shaping force (e.g., pressure, force, mass, or resistance, etc.) and controlling a force used in forming the component (e.g., extrusion, compression, pressing, rolling, etc. used to form the component) in response to the monitored shaping force.

The process also may include sintering at a temperature of at least 1500° C., such as from 1500° C. to 1800° C., and may also include the step of further sintering or annealing the sintered component at a temperature of at least 1500° C. For further example, heating to a temperature of at least 1800° C. for at least two hours, wherein after such processing the component has porosity at ambient temperature in the range of from 5 to 45 vol. % based upon the formed volume of the component, and an MOR of at least 6 kpsi (41 MPa) or more preferably an MOR of at least 10 kpsi (69 MPa); and normalized thermal shock resistance rating of at least four or more preferably at least five. The process of may still further include the step of further heating the sintered component at a temperature of at least 1500° C., or at least 1600° C., or at least 1700° C., for at least two hours, wherein after such further heating the component comprises a porosity at ambient temperature in the range of from 5 to 45 vol %, based upon the volume of the component.

While the present invention has been described and illustrated with respect to certain embodiments, it is to be understood that the invention is not limited to the particulars disclosed and extends to all equivalents within the scope of the claims. Unless otherwise stated, all percentages, parts, ratios, etc. are by weight. Unless otherwise stated, a reference to a compound or component includes the compound or component by itself as well as in combination with other elements, compounds, or components, such as mixtures of compounds. Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

What is claimed is:

1. A heat stable, formed ceramic component, said component comprising:
   a multimodal grain distribution including:
   (i) at least 50 wt % of coarse grains including partially stabilized zirconia, said coarse grains comprising a D50 grain size in the range of from 5 to 800 µm, based upon the total weight of said component wherein said partially stabilized zirconia comprises 1 mole % to 7 mole % yttria per mole of partially stabilized zirconia; and
   (ii) at least 1 wt % of fine grains comprising a D50 average grain size not greater than one-fourth the D50 grain size of said coarse grain, dispersed within said coarse grains, based upon the total weight of said component;
   wherein (a) after sintering, said component has porosity at ambient temperature in the range of from 5 to 45 vol. %, based on the volume of said formed component, (b) wherein said fine grains have a grain mode comprises a D50 grain size of from 0.05 µm to 5.0 µm, and said grains have a grain mode comprises a D50 grain size of from 20 µm to 200 µm, and (c) wherein said fine grains consist essentially of a stabilizer or a stabilized zirconia.

2. The component of claim 1, wherein said fine grains consist essentially of yttria.

3. The component of claim 1, wherein said formed ceramic component was sintered at a temperature of at least 1500° C.

4. The component of claim 1, wherein said formed ceramic component comprises a flexural strength (MOR) of at least 6 kpsi and a normalized thermal shock resistance rating of at least four.

5. The component of claim 1, wherein said (MOR) flexural strength is at least 10 kpsi.

6. The component of claim 1, wherein said normalized thermal shock resistance rating is at least four.

7. The component of claim 1, wherein said fine grain mode comprises a D50 grain size of from 0.01 µm to 100 µm.

8. The component of claim 1, wherein said fine grain mode includes a D50 grain size of 0.05 µm to 44 µm.

9. The component of claim 1, wherein said fine grain mode includes a D50 grain size that is not greater than one-eighth the size of a D50 average grain size of said coarse grain mode.

10. The component of claim 1 wherein said bimodal distribution of grains comprises from 1 to 20 wt % of said fine grains and from 80 to 99 wt % of said coarse grains.

11. The component of claim 1 wherein said bimodal distribution of grains comprises from 1 to 15 wt % of said fine grains and from 85 to 99 wt % of said coarse grains.

12. The component of claim 3 wherein after annealing said sintered component at a temperature of at least 1800° C. for two hours said component includes porosity at ambient temperature in the range of from 5 to 45 vol % based upon the volume of said component, a MOR of at least 6 kpsi, and a normalized thermal shock resistance rating of at least four.

13. The component of claim 1 wherein said porosity is in the range of from 10 to 30 vol % based on the volume of said formed component.

14. The component of claim 1, wherein the shape of at least a majority by weight of said coarse grains have a shape factor of not greater than 2.5.

15. The component of claim 1, wherein the shape of at least a majority by weight of said fine grains have a shape factor of not greater than 2.5.

16. The component of claim 1, wherein said multimodal grain distribution further comprises;
   (iii) at least 5 wt % of an intermediate grain mode of stabilized zirconia including a D50 grain size intermediate the D50 grain size of each of said coarse grain mode and said fine grain mode, based upon the total weight of said component.

* * * * *